US012749129B1

(12) United States Patent
Ramos

(10) Patent No.: US 12,749,129 B1
(45) Date of Patent: Sep. 29, 2026

(54) PAYROLL-INTEGRATED MOBILE DEVICE COMPLIANCE INCENTIVE SYSTEM

(71) Applicant: Fabian A Ramos, Bradenton, FL (US)

(72) Inventor: Fabian A Ramos, Bradenton, FL (US)

(73) Assignee: Clock Filter, LLC, Bradenton, FL (US)

( * ) Notice: Subject to any disclaimer, the term of this patent is extended or adjusted under 35 U.S.C. 154(b) by 0 days.

(21) Appl. No.: 19/463,198

(22) Filed: Jan. 29, 2026

(51) Int. Cl.
*G06Q 40/12* (2023.01)
*G06Q 10/1091* (2023.01)

(52) U.S. Cl.
CPC ....... *G06Q 40/125* (2013.12); *G06Q 10/1091* (2013.01)

(58) Field of Classification Search
CPC ......................... G06Q 40/125; G06Q 10/1091
See application file for complete search history.

(56) References Cited

U.S. PATENT DOCUMENTS

| | | | | |
|---|---|---|---|---|
| 7,004,389 | B1 * | 2/2006 | Robinson | G07C 1/10 235/382 |
| 8,271,057 | B2 | 9/2012 | Levine et al. | |
| 9,020,848 | B1 | 4/2015 | Ridge et al. | |
| 9,485,206 | B2 | 11/2016 | Day, II et al. | |
| 10,719,793 | B1 * | 7/2020 | Smith | G06N 20/00 |
| 11,082,553 | B2 | 8/2021 | Isgar | |
| 11,087,412 | B1 * | 8/2021 | Ho | G06Q 40/125 |
| 11,494,850 | B1 * | 11/2022 | Fontenot | G06Q 40/125 |
| 11,880,788 | B1 * | 1/2024 | Ho | G06Q 10/06398 |

(Continued)

FOREIGN PATENT DOCUMENTS

| | | | | |
|---|---|---|---|---|
| AU | 2015302225 B2 * | 3/2018 | | G06Q 40/125 |
| CN | 108989992 A * | 12/2018 | | H04W 4/029 |
| WO | WO-0041104 A2 * | 7/2000 | | G07C 1/10 |

OTHER PUBLICATIONS

S.-H. Li, C. C. Hu and C.-C. Liu, "Implement Privacy Protection Act in Human Payroll System," 2011 International Symposium on Computer Science and Society, Kota Kinabalu, Malaysia, 2011, pp. 369-372 (Year: 2011).*

(Continued)

*Primary Examiner* — Ashford S Hayles
(74) *Attorney, Agent, or Firm* — Trenam Law; Anton J. Hopen

(57) ABSTRACT

A payroll-integrated compliance platform is disclosed for automatically adjusting employee payroll data based on verified mobile-device engagement during work intervals. A backend system ingests clock-in and clock-out records from an external payroll or timekeeping provider, determines a monitored work interval, and receives privacy-preserving engagement telemetry from an enrolled employee mobile device. The backend computes a compliance score using configurable rules that can account for breaks, approved exceptions, and permitted categories of use. The backend then generates a payroll adjustment record representing a compensation change, a time classification change, or both, and transmits the payroll adjustment record to the external payroll provider for automated application. Incentive models include voluntary enrollment with rewards for reduced non-work engagement, punitive adjustments for excessive non-work engagement, and pooled bonus distributions to top-ranked compliant employees for a defined period.

17 Claims, 20 Drawing Sheets

(56) References Cited

U.S. PATENT DOCUMENTS

| | | | | |
|---|---|---|---|---|
| 12,271,954 | B2 * | 4/2025 | Azogui | G06Q 40/125 |
| 12,469,089 | B1 * | 11/2025 | Haitz | G03F 7/091 |
| 2003/0004847 | A1 * | 1/2003 | Calderaro | G06Q 40/00 705/36 R |
| 2004/0019542 | A1 * | 1/2004 | Fuchs | G07C 1/14 705/32 |
| 2004/0158512 | A1 * | 8/2004 | Dean | G06Q 40/125 705/32 |
| 2004/0249938 | A1 * | 12/2004 | Bunch | H04L 63/0245 709/224 |
| 2005/0021428 | A1 * | 1/2005 | Costello | G06Q 10/109 705/32 |
| 2005/0177477 | A1 * | 8/2005 | Arghavanifard | G06Q 10/06 705/32 |
| 2007/0055592 | A1 * | 3/2007 | Vu | G06Q 40/125 705/32 |
| 2007/0178908 | A1 * | 8/2007 | Doyle | G08G 1/127 455/456.1 |
| 2007/0178909 | A1 * | 8/2007 | Doyle | G01S 5/0027 455/456.1 |
| 2007/0276722 | A1 * | 11/2007 | Silvera | G06Q 10/06393 705/7.42 |
| 2008/0070495 | A1 | 3/2008 | Stricklen et al. | |
| 2009/0138342 | A1 * | 5/2009 | Otto | G06Q 30/02 706/45 |
| 2009/0204434 | A1 * | 8/2009 | Breazeale, Jr. | G07C 1/10 705/2 |
| 2009/0264116 | A1 | 10/2009 | Thompson | |
| 2011/0252240 | A1 | 10/2011 | Freedman et al. | |
| 2012/0083287 | A1 | 4/2012 | Casto et al. | |
| 2012/0233044 | A1 * | 9/2012 | Burger | G06Q 10/06 705/32 |
| 2012/0265573 | A1 * | 10/2012 | Van Pelt | G06Q 10/06311 705/7.14 |
| 2013/0171593 | A1 * | 7/2013 | Gorman | G09B 5/00 434/219 |
| 2013/0211975 | A1 * | 8/2013 | Masterson | G06Q 10/105 705/28 |
| 2013/0290200 | A1 * | 10/2013 | Singhal | G06Q 30/018 705/317 |
| 2014/0278629 | A1 * | 9/2014 | Stephenson | H04L 67/535 705/7.13 |
| 2014/0278638 | A1 * | 9/2014 | Kreuzkamp | G06Q 10/06398 705/7.15 |
| 2014/0278828 | A1 * | 9/2014 | Dorcas | G06Q 30/0207 705/7.42 |
| 2015/0262112 | A1 * | 9/2015 | Raanan | H04W 4/029 705/7.15 |
| 2015/0310566 | A1 * | 10/2015 | Smyth | G06Q 40/125 705/32 |
| 2015/0327011 | A1 * | 11/2015 | Fairbanks | G01S 5/013 455/456.3 |
| 2015/0363745 | A1 * | 12/2015 | Hatch | G06Q 10/1091 705/32 |
| 2016/0042308 | A1 * | 2/2016 | Aptakin | G06Q 10/063114 705/7.15 |
| 2016/0048929 | A1 * | 2/2016 | Parento | G06Q 20/0855 705/32 |
| 2016/0078390 | A1 * | 3/2016 | Grewal | G06Q 10/06398 705/7.42 |
| 2016/0142355 | A1 * | 5/2016 | Morten | G06Q 10/10 709/206 |
| 2016/0150365 | A1 * | 5/2016 | Brown | H04W 12/033 455/410 |
| 2016/0203530 | A1 * | 7/2016 | Shaaban | G09C 1/00 705/38 |
| 2016/0217422 | A1 * | 7/2016 | Dujisin | G06Q 10/103 |
| 2016/0224205 | A1 * | 8/2016 | Fulton | G06F 3/0481 |
| 2016/0239807 | A1 * | 8/2016 | Creighton | G06Q 10/1057 |
| 2017/0024683 | A1 * | 1/2017 | Bares | G06Q 10/063116 |
| 2017/0140390 | A1 * | 5/2017 | Degeneffe | G06Q 30/018 |
| 2017/0243170 | A1 * | 8/2017 | Rashid | H04W 4/021 |
| 2018/0349854 | A1 * | 12/2018 | Wigand | G06Q 10/1091 |
| 2019/0057340 | A1 * | 2/2019 | Wang | G06Q 10/109 |
| 2019/0108489 | A1 * | 4/2019 | Hollis | G06Q 10/1057 |
| 2019/0149652 | A1 | 5/2019 | Rodriguez Bravo et al. | |
| 2019/0362431 | A1 * | 11/2019 | Hertz | G06Q 10/0635 |
| 2020/0118219 | A1 * | 4/2020 | Mauricio | G06Q 10/105 |
| 2020/0120049 | A1 | 4/2020 | Galloway | |
| 2020/0242605 | A1 * | 7/2020 | Shah | G06Q 10/105 |
| 2020/0349493 | A1 * | 11/2020 | Phillips | G06Q 10/105 |
| 2020/0380436 | A1 * | 12/2020 | Bonomo | G06Q 10/1091 |
| 2021/0142259 | A1 * | 5/2021 | Kalia | G06Q 10/06316 |
| 2021/0279816 | A1 * | 9/2021 | Gaur | G06Q 10/067 |
| 2021/0312571 | A1 * | 10/2021 | Mimassi | G06Q 20/322 |
| 2022/0076506 | A1 | 3/2022 | de Matos et al. | |
| 2022/0172169 | A1 * | 6/2022 | Carzoli | G06Q 10/105 |
| 2022/0277252 | A1 * | 9/2022 | Serafina | G06Q 10/06398 |
| 2022/0375002 | A1 * | 11/2022 | Azogui | G06Q 40/125 |
| 2023/0156569 | A1 | 5/2023 | Breaux, III et al. | |
| 2024/0070626 | A1 * | 2/2024 | Loubardeas | G06Q 20/06 |
| 2025/0124392 | A1 * | 4/2025 | Gibbs Djibom | G06Q 10/06398 |
| 2026/0030595 | A1 * | 1/2026 | Berman | G06Q 10/1057 |

OTHER PUBLICATIONS

Nagele-Piazza, L. (2023). The Pros and Cons of Monitoring Remote Workers. HR Magazine, 68(2), 20-23. (Year: 2023).*

Apple Support "Use the Driving Focus on your iPhoneto concentrate on the road" Apr. 24, 2024. pp. 1-6. United States. https://support.apple.com/en-us/108384.

Apple Support "Allow or silence notifications for a Focus on iPhone" Apr. 2024. pp. 1-3. United States. https://support.apple.com/guide/iphone/allow-or-silence-notifications-for-a-focus-iph21d43af5b/ios.

Truce Software "Eliminate Mobile Distractions at Work" 2025. pp. 1-9. United States. https://trucesoftware.com/workplace/.

Android Help "Manage how you spend time on your Android phone withDigital Wellbeing" Dec. 2025. United States. https://support.google.com/android/answer/9346420?hl=en.

Microsoft 365 for frontline workers/ Microsoft Learn "Limit access to Microsoft Teams when frontline workers are off shift" Oct. 2024. pp. 1-7. United States. https://learn.microsoft.com/en-us/microsoft-365/frontline/flw-working-time?view=o365-worldwide.

Gema Howell et al. "Guidelines for Managing the Security of Mobile Devices in the Enterprise" May 2023. pp. 1-61. NIST Special Publication NIST SP 800-124r2. Gaithersburg, MD https://nvlpubs.nist.gov/nistpubs/SpecialPublications/NIST.SP.800-124r2.pdf.

* cited by examiner

PAYROLL-INTEGRATED MOBILE DEVICE COMPLIANCE INCENTIVE SYSTEM

FIELD OF THE DISCLOSURE

Aspects of the present disclosure generally relate to systems that integrate mobile-device compliance verification with external payroll and timekeeping providers to automatically generate and transmit payroll data adjustments responsive to quantified device engagement during work intervals.

BACKGROUND OF THE INVENTION

This invention relates, generally, to payroll and timekeeping systems that store authoritative employee work-time records and compensation data. More specifically, it relates to integrating payroll provider records with privacy-preserving mobile-device engagement verification to automatically apply incentive-based or punitive payroll adjustments and related audit records during defined work intervals.

Brief Description of the Art

Organizations have long tried to reduce non-work smartphone engagement during paid work time because distraction can affect productivity, safety, and service quality, including during on-the-clock driving or equipment operation where distraction can increase safety risk and employer liability. However, most existing approaches are disconnected from the systems that actually determine compensation. Employers typically treat timekeeping and payroll platforms as authoritative, yet phone-distraction policies are often enforced informally through supervision or employee handbooks, making it difficult to apply consistent incentives or consequences at scale.

A common shortcoming in current solutions is that device restriction features, such as operating-system focus modes, can reduce notifications or pause applications but do not reliably produce an auditable, payroll-actionable record of compliance during specific clocked work intervals. Even where a phone can be placed into a restricted state, the employer still faces the practical question of how to translate verified non-use or verified use into a structured payroll adjustment that can be processed by existing payroll providers without manual spreadsheet workflows and without exposing sensitive personal information.

Another persistent problem is heterogeneity among payroll and timekeeping vendors. Organizations use different providers, and vendors represent similar concepts in different event formats. In the real world, clock-in events can be duplicated, delayed, corrected after the fact, or received out of order. Without normalization and idempotent processing, a compliance system can generate inconsistent work intervals and inconsistent payroll adjustments, undermining trust and creating administrative overhead. A commercially usable solution must therefore ingest vendor-specific timekeeping data, normalize it into a canonical form, suppress duplicates, and still produce correct, deterministic payroll adjustment records.

Incentive design can vary by organization. Some employers prefer positive incentives that encourage employees to voluntarily adopt tools that validate reduced non-work engagement, while other employers may require a punitive option for repeated violations or a hybrid model. It can be desirable for a solution to support configurable models that enable voluntary enrollment, compute compliance scores from privacy-preserving telemetry, and automatically communicate the resulting incentives or penalties to a payroll system without manual handling. Group incentives, such as distributing a fixed bonus pool to top-performing compliant employees, may also be implemented and can involve ranking and allocation logic tied to payroll systems.

Legal and employee-protection constraints further complicate implementation. Workplace break requirements, reasonable accommodations, and permitted exceptions mean that any compliance metric must be able to exclude authorized intervals from scoring. Absent an exception and annotation workflow, employees can be unfairly penalized for necessary actions such as two-factor authentication or emergency communications. Likewise, break handling often requires tracking aggregated time in threshold windows and enforcing or classifying breaks in a way that aligns with configured policy and jurisdictional requirements.

Accurate recordkeeping of hours worked can be implicated when device-policy automation is coupled to timekeeping. In some embodiments, the disclosed system is configured to decouple (i) device restriction and compliance scoring automation from (ii) authoritative timekeeping records used for compensation, such that a restriction transition, a scoring segment boundary, or a default interval closure does not, by itself, constitute a final payroll-determinative record of hours worked.

In some embodiments, where an automated default is applied due to incomplete, delayed, or missing timekeeping events, the system generates a reviewable provisional state and initiates a verification workflow rather than finalizing a payroll-impacting truncation of a work interval. This reduces the likelihood that automated defaults cause paid working time to be omitted from timekeeping records.

Privacy and liability concerns can affect deployment of device-engagement compliance programs. For example, some monitoring approaches collect application identities, message content, or location data, which may increase privacy risk and administrative burden. It can be desirable to implement technical constraints that prevent collection and transmission of prohibited data fields while still allowing computation of compliance metrics sufficient for payroll incentives. Category-based reporting, on-device classification, and telemetry firewalls are examples of techniques that can reduce exposure while preserving operational usefulness. In driving-safety embodiments, vehicle motion can be detected using on-device GPS-derived speed or motion signals without transmitting raw location coordinates.

Accordingly, there remains a need for a payroll-integrated system that (i) aligns device engagement verification with authoritative timekeeping and payroll records, (ii) supports configurable incentive models including reward, punitive, and pooled distributions, (iii) automatically generates and transmits payroll adjustment records to a payroll provider, and (iv) does so using reliable normalization, auditability, and privacy-preserving telemetry controls.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the problems or deficiencies discussed herein.

BRIEF SUMMARY OF THE INVENTION

In one aspect, a server system integrates with an external payroll provider system to ingest authoritative employee timekeeping records including at least clock-in and clock-out records for an employee. The server system determines a monitored work interval based on the clock-in timestamp and the clock-out timestamp, and receives device engagement telemetry from a user device associated with the employee corresponding to the monitored work interval. The device engagement telemetry includes at least category-level usage metrics and/or non-work interaction event indicators suitable for compliance analysis and can further include a driving-state indicator for identifying driving sub-intervals during which stricter policies may apply.

The server system computes a compliance score using the device engagement telemetry and a policy rule set. Based on the compliance score, the server system generates a payroll adjustment record specifying a compensation adjustment, a paid-time classification adjustment, or both, and transmits the payroll adjustment record to the external payroll provider system to cause an automated update of payroll data for the employee. In some implementations, the payroll adjustment record is used to automatically apply a bonus, adjust paid or unpaid classifications for defined portions of time, or apply other payroll adjustments consistent with tenant configuration. In some implementations, the system further generates real-time feedback indicators (for example, icon or emoji cues) associated with earned bonuses, applied deductions or unpaid-time classifications, and approved exceptions, and can generate employer alerts when employee activity exceeds configurable thresholds.

In some embodiments, the system supports voluntary enrollment, where the server system generates payroll adjustment records only when an enrollment indicator indicates the employee has enrolled in an incentive program for a payroll period. In reward-mode embodiments, the payroll adjustment records specify positive compensation adjustments responsive to compliance thresholds. In punitive-mode embodiments, the payroll adjustment records may specify negative compensation adjustments and/or paid-time classification adjustments responsive to non-compliance thresholds. In some embodiments, a driving employee can voluntarily enroll in an insurance program in which driving-state compliance metrics are generated and transmitted to an insurance provider system to support premium or discount determinations.

In some embodiments, the system supports pooled incentive distributions, where the server system computes compliance scores for multiple employees for an incentive period, ranks employees by compliance, allocates a bonus pool amount across top-ranked employees, and transmits corresponding payroll adjustment records to the external payroll provider system for automated distribution. In some embodiments, the bonus pool amount is configured to be cash-neutral by funding the pool from amounts associated with unpaid-time classifications and/or deductions assessed for non-compliance.

In some embodiments, the system accounts for legally required or policy-defined breaks and for approved exceptions by excluding telemetry occurring during break intervals identified by payroll-provider records or during approved exception intervals indicated by approved annotation records. In some embodiments, the mobile device applies privacy-preserving measures including an on-device category dictionary that maps application identifiers to category codes and a telemetry firewall that blocks prohibited data fields such as application identifiers, message content, contact names, or location coordinates. In some implementations, device policies are allowlist-based such that only specified applications and/or phone numbers are permitted during restricted intervals, while emergency services numbers such as 911 remain permitted.

In some embodiments, the server system uses an integration adapter layer that normalizes vendor-specific timekeeping events into canonical event records and applies idempotent processing using idempotency keys to suppress duplicate events before computing monitored work intervals and generating payroll adjustment records.

BRIEF DESCRIPTION OF THE DRAWINGS

The appended drawings are provided to facilitate a more detailed understanding of the features of the present disclosure and to support the following specific description. The disclosure is described below with reference to certain aspects, some of which are illustrated in the appended drawings. It should be understood that the appended drawings depict only illustrative examples of the disclosure and are therefore not to be considered as limiting its scope, as the description may encompass other equally effective implementations. In some instances, the same reference numbers in different drawings may be used to identify the same or similar elements for ease of understanding.

DETAILED DESCRIPTION OF THE INVENTION

Figure 1:
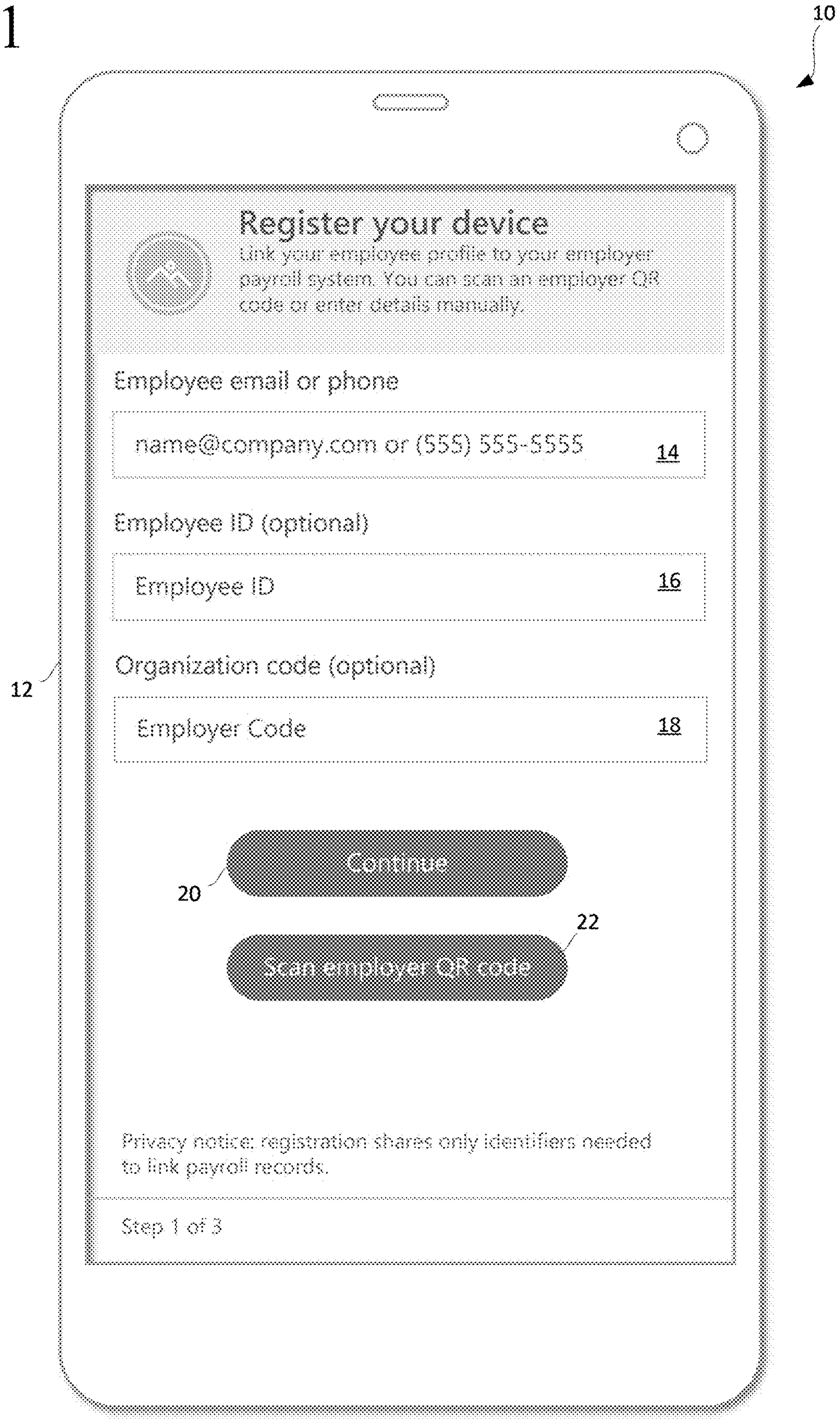
FIG. 1 is a front view of an employee mobile registration interface for linking a mobile device to an employer account associated with an external payroll provider.

The present disclosure relates to payroll-integrated systems that determine employee work intervals based on authoritative timekeeping records and payroll-provider records. The systems can compute payroll-actionable compliance metrics from privacy-preserving mobile-device engagement telemetry and can automatically generate and transmit payroll adjustment records based on the computed metrics. In various embodiments, the payroll adjustment records implement incentive models including a reward mode, a punitive mode, and pooled bonus distributions allocated across a plurality of employees based on measured compliance. FIGS. 1 through 20 illustrate non-limiting example user interfaces, system blocks, and data flows for such embodiments.

Unless otherwise defined, technical terms used herein have the meaning commonly understood by one of ordinary skill in the art to which the invention pertains. As used herein, the singular forms a, an, and the include plural referents unless the context clearly dictates otherwise. As used herein, the term or is inclusive and includes and/or unless the context clearly dictates otherwise. The terms include, including, and such as are used in an open-ended sense. When a feature or result is described as being based on a factor, the feature or result can be based at least in part on that factor.

In the following description, reference is made to the accompanying drawings, which form a part hereof, and in which are shown by way of illustration specific embodiments in which the invention may be practiced. It will be understood that other embodiments may be utilized and that structural, logical, or operational changes may be made without departing from the scope of the claimed invention. In addition, it will be understood that processes and devices described with reference to one embodiment may be combined with other embodiments unless the context clearly indicates otherwise. Like reference numerals designate like elements throughout the drawings.

Overview of an Exemplary Payroll Integrated Compliance Platform

Figure 12:
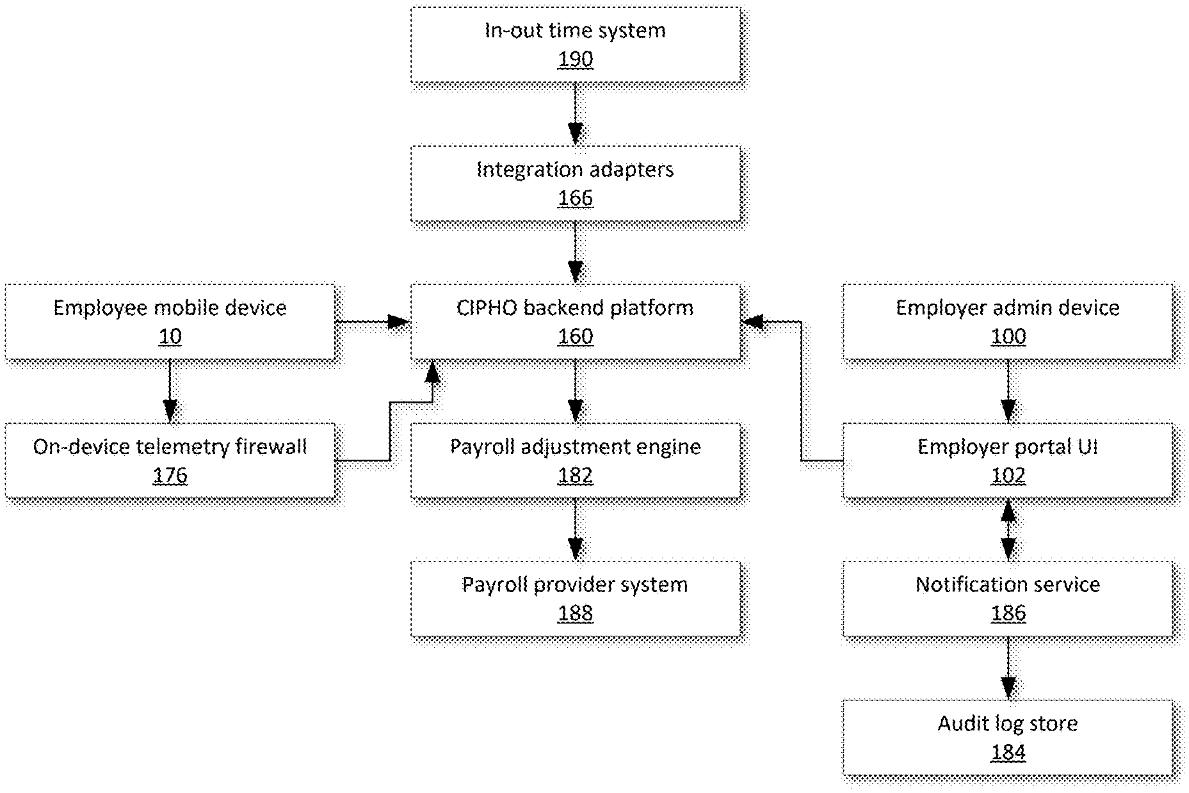
FIG. 12 is a block diagram showing interactions among employee devices, employer systems, a middleware platform, and external timekeeping and payroll provider systems.

In some embodiments, the disclosed system includes an employee mobile device 10 executing a mobile client application 12, an employer administrative device 100 executing or accessing an employer portal user interface 102, and a middleware platform comprising a backend platform 160 that integrates with an in-out time system 190 and a payroll provider system 188 via one or more integration adapters 166, as generally shown in FIG. 12. In some embodiments, the backend platform 160 is referred to as a Clock-In, Phone-Off platform and may be labeled CIPHO in the drawings and in this description, although this label is not limiting.

The backend platform 160 can include one or more server computers, virtual machines, containers, or combinations thereof, that execute the services described herein. In some embodiments, the backend platform 160 is implemented as a multi-tenant service in which tenant boundaries are enforced by tenant identifiers, access controls, and data partitioning. For example, tenant-isolated data may be maintained in tenant configuration store 204, reporting and metrics store 206, and audit log store 184, as shown in FIGS. 13, 15, 16, and 20.

A primary technical function of backend platform 160, in some embodiments, is to receive timekeeping event records for an employee, determine a monitored work interval based on the timekeeping event records, receive device engagement telemetry corresponding to at least a portion of the monitored work interval, compute a compliance score using the device engagement telemetry and a policy rule set, generate a payroll adjustment record based on the compliance score, and transmit the payroll adjustment record to payroll provider system 188 so that payroll data associated with the employee is updated without manual spreadsheet workflows.

In some embodiments, the system improves reliability of payroll-actionable compliance by normalizing vendor-specific timekeeping events into canonical event records and by applying idempotent processing. In this manner, duplicate, delayed, corrected, or out-of-order timekeeping events can be processed deterministically so that monitored work intervals remain consistent and duplicate payroll adjustment submissions are suppressed.

Figure 15:
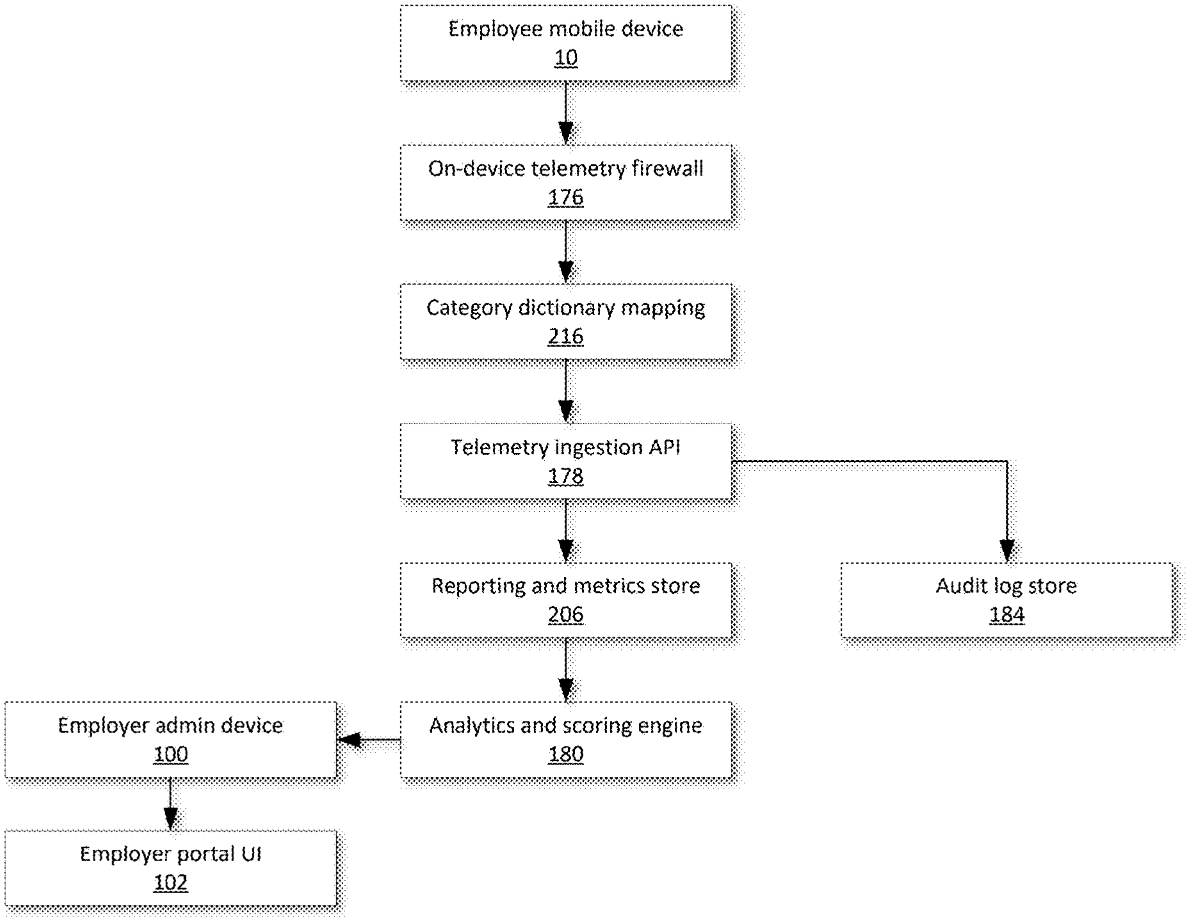
FIG. 15 is a flow diagram showing privacy-preserving telemetry collection and category-only reporting used for compliance scoring.

In some embodiments, the system improves privacy by using technical constraints on telemetry capture and telemetry transmission. For example, mobile client application 12 can use an on device telemetry firewall 176 and a category dictionary mapping 216 so that outbound device engagement telemetry contains category level metrics or non work event indicators sufficient for compliance scoring while blocking prohibited data fields such as application identifiers, message content, contact names, or location coordinates, as shown in FIGS. 12 and 15.

In some embodiments, enforced device restriction features are optional. For example, the system can function by measuring device engagement and generating payroll adjustments even when employee mobile device 10 is not placed into a restricted operating mode. In other embodiments, restrictions are used to reduce non-work interactions and to align employee expectations during controlled work intervals, as reflected by controlled work interval panel 66 in FIG. 6 and by restriction issuance shown in FIG. 14.

Exemplary Client and Server Roles and Data Objects

In some embodiments, the mobile client application 12 executes on employee mobile device 10 and performs one or more of: enrollment and device registration, telemetry generation, on device category mapping, telemetry firewall enforcement, user interface rendering for employee dashboards, break initiation, exception annotation, and secure transmission of telemetry and annotation records to backend platform 160. In some embodiments, employer portal UI 102 executes in a web browser or a mobile application on employer admin device 100 and provides administrative configuration, workforce monitoring, exception approvals, pooled bonus distribution tools, and submission control for payroll batches.

In some embodiments, backend platform 160 includes or coordinates: device API controller 162, admin portal controller 164, integration adapters 166, canonical event normalizer 168, restriction state machine 170, policy engine and compiler 172, device command service 174, telemetry ingestion API 178, analytics and scoring engine 180, payroll adjustment engine 182, payroll batch submission 208, webhook listener 210, idempotency filter 212, OAuth token manager 214, tamper response engine 200, break aggregation engine 198, notification service 186, and audit log store 184, as shown in FIGS. 12 through 20.

In some embodiments, the system further uses a time record attestation record that indicates that an employee reviewed a presented summary of timekeeping records for a pay period or shift and either (i) affirmed that the presented records reflect all hours worked or (ii) submitted a correction request. In some embodiments, the time record attestation record includes employee identifier, tenant identifier, time window identifier, attestation state, timestamp, and a presented-record hash for auditability.

Figure 13:
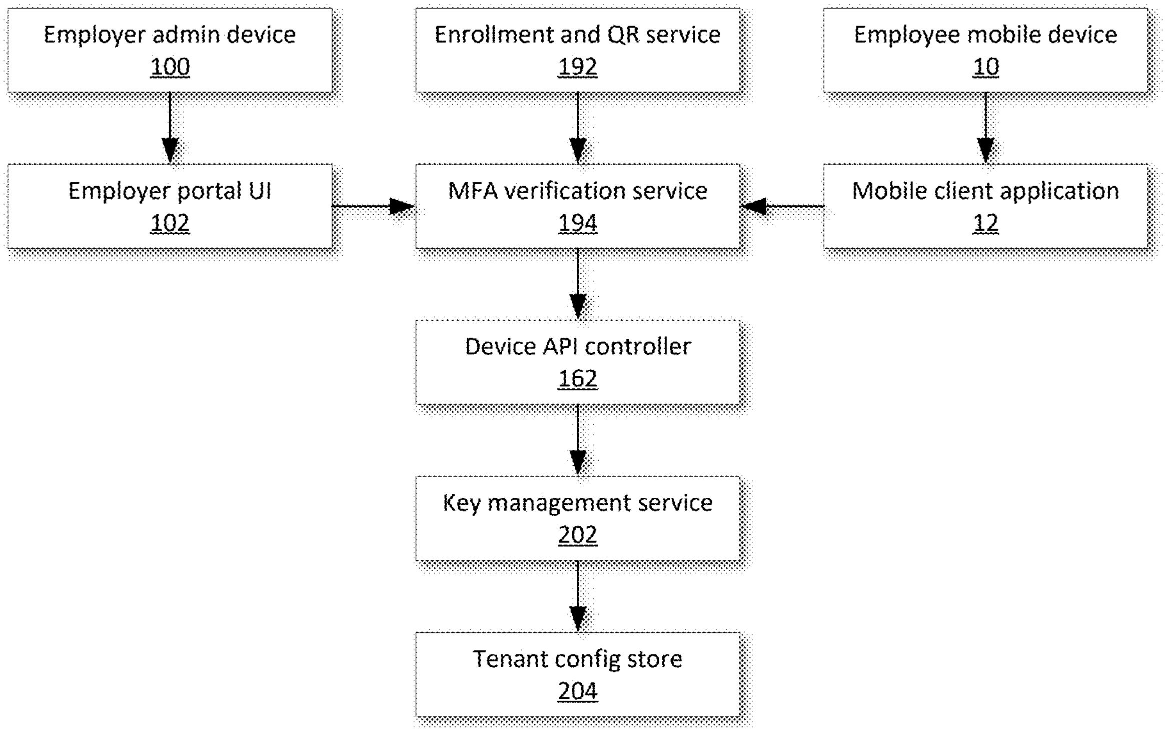
FIG. 13 is a data flow diagram showing enrollment, identity verification, and device registration for linking an employee device to an employer tenant.
Figure 20:
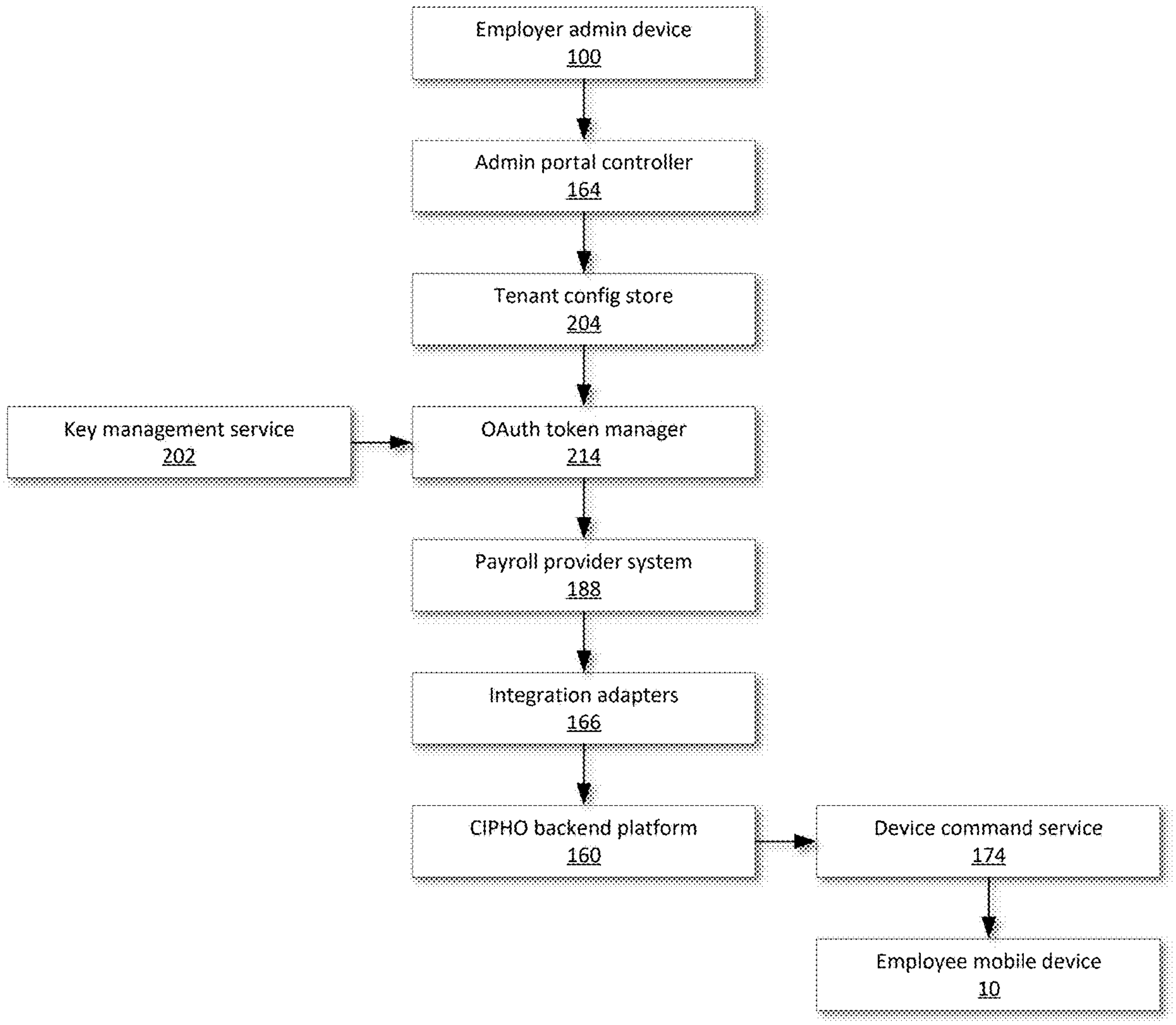
FIG. 20 is a flow diagram showing employer administrative setup of policy rules and payroll provider API integration credentials for operational deployment.

In some embodiments, key management service 202 generates, stores, rotates, and revokes cryptographic material used to authenticate device telemetry and to secure sensitive integration credentials, as shown in FIGS. 13 and 20.

In some embodiments, the system uses data records including, without limitation: timekeeping records such as a clock in record and a clock out record received from an external payroll provider system or timekeeping system; canonical event records generated by canonical event normalizer 168 to unify vendor formats; enrollment indicators indicating voluntary enrollment and program mode selection; device engagement telemetry including at least one of a category level usage metric or a non work interaction event indicator; approved annotation records reflecting approved exception intervals; break records and break interval computations; payroll adjustment records specifying at least one of a compensation adjustment or a paid time classification adjustment; and audit records stored in audit log store 184 describing events, decisions, submissions, acknowledgments, and error conditions.

Employee Enrollment, Device Registration, and Payroll Linking

FIG. 1 illustrates an employee side registration flow presented on employee mobile device 10. In the illustrated embodiment, mobile client application 12 presents a registration interface that includes an employee email or phone field 14, an employee ID field 16, and an additional identifier field 18 such as an organization code, employer code, tenant code, or other linking identifier. A continue button 20 is selectable to initiate enrollment using the entered identifiers. A scan employer QR button 22 is selectable to initiate enrollment using an employer provided enrollment code represented as a QR code. These elements are visually indicated by their reference numerals in FIG. 1.

In some embodiments, the identifiers provided via employee email or phone field 14, employee ID field 16, and additional identifier field 18 are used to map employee mobile device 10 to an employee record maintained in payroll provider system 188 or in an employer directory, while minimizing the scope of transmitted or stored information. For example, the employee email or phone field 14 may be hashed or tokenized prior to storage, and only a provider compatible employee identifier is retained for payroll mapping. In some embodiments, backend platform 160 creates an association between the employee and a tenant configuration maintained in tenant configuration store 204.

Figure 2:
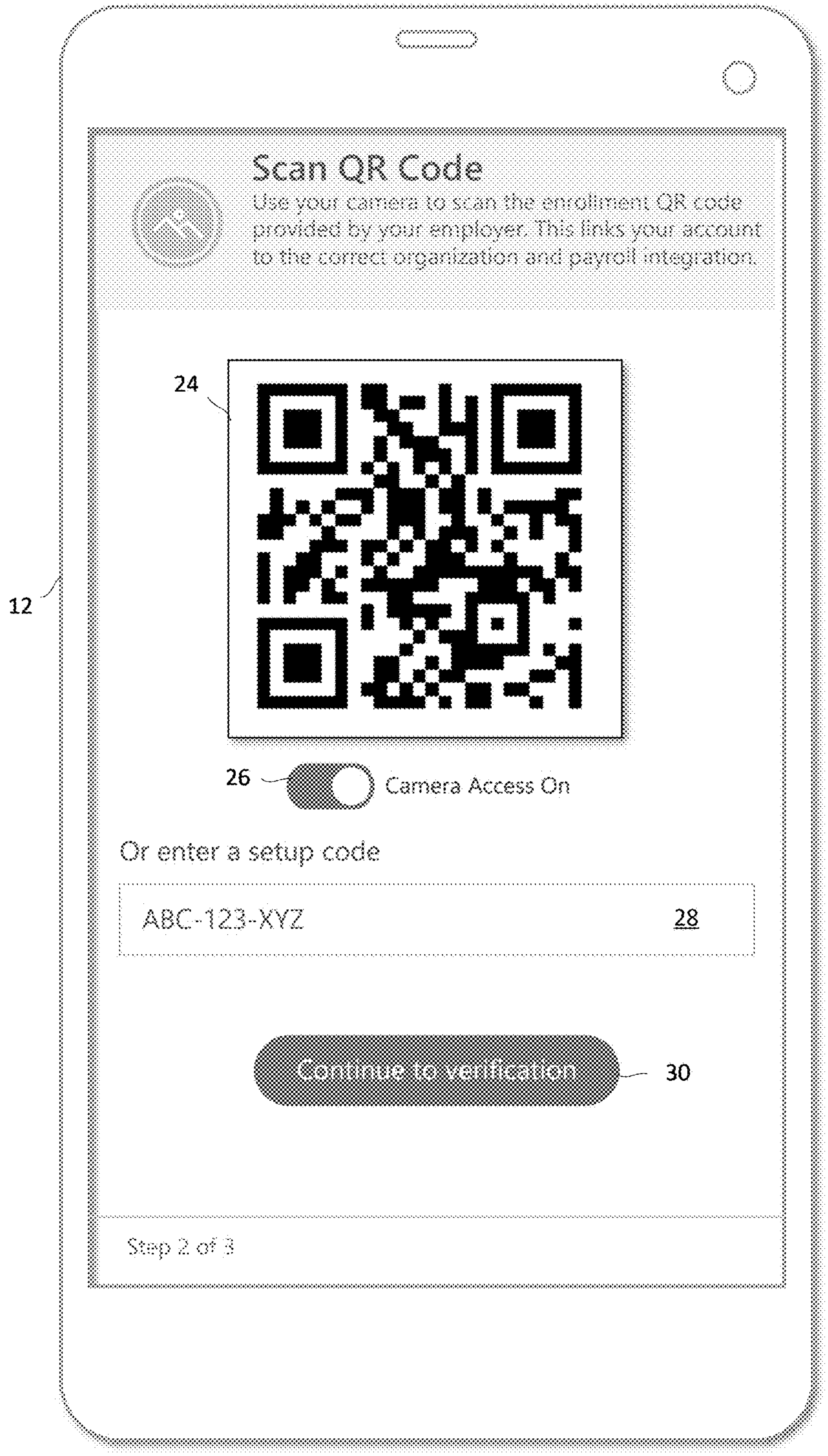
FIG. 2 is a front view of a QR code scanning interface for associating an employee device with an employer tenant and payroll integration.

FIG. 2 illustrates a QR based enrollment interface. In the illustrated embodiment, a QR code image 24 displayed on the interface represents an enrollment payload that includes, for example, a tenant identifier, a provider identifier, an enrollment token, a time limited session identifier, or a combination. A camera access toggle 26 controls whether camera access is enabled for scanning. A setup code field 28 receives a manually entered enrollment code as an alternative to scanning. A continue to verification button 30 proceeds to an identity verification step. These elements are visually indicated by their reference numerals in FIG. 2.

Figure 3:
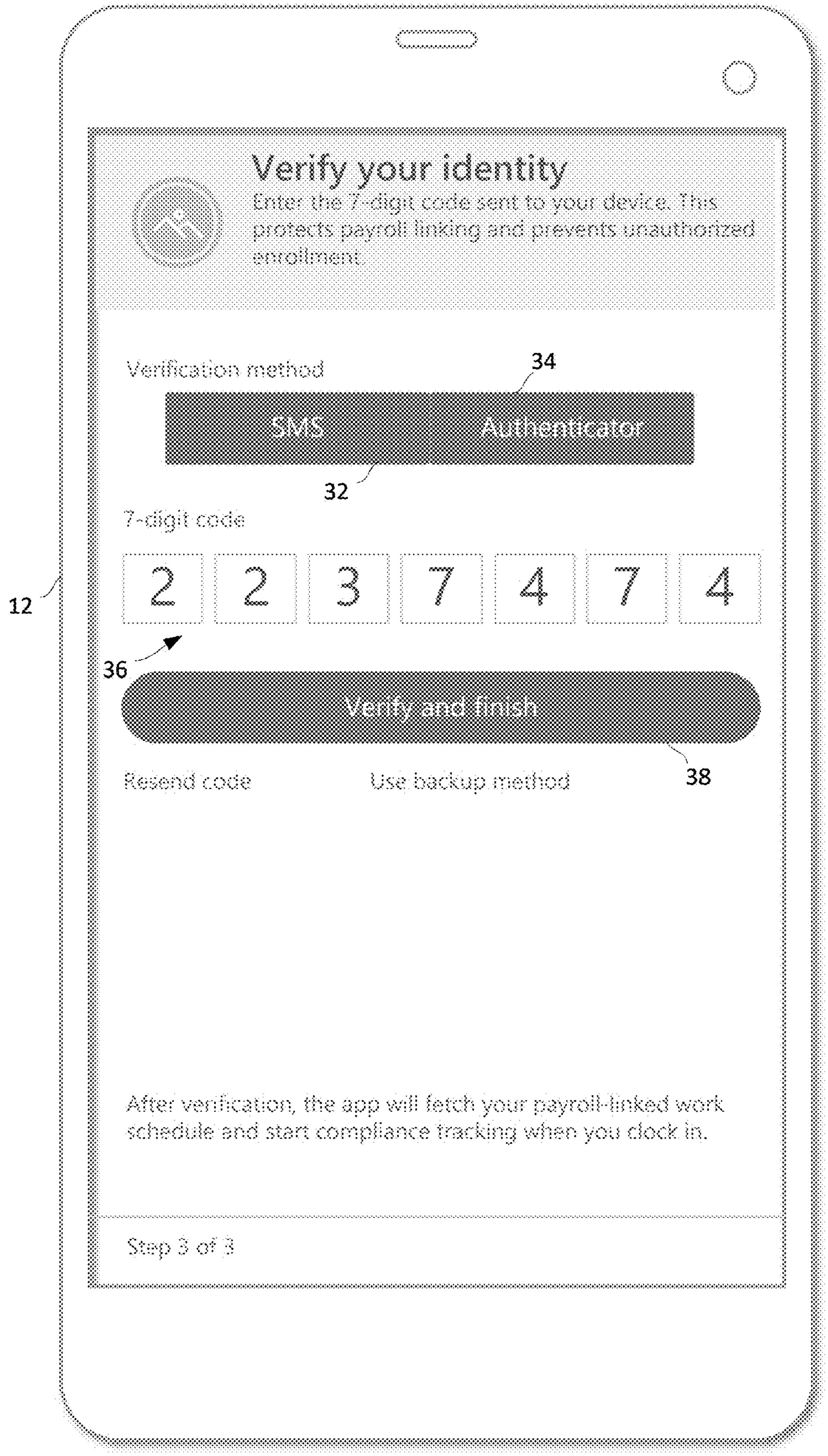
FIG. 3 is a front view of an identity verification interface providing multi-factor authentication during device enrollment.

FIG. 3 illustrates an identity verification interface. In the illustrated embodiment, the identity verification interface provides a verification method selector 32 with a short message service option and an authenticator option 34, or other multi factor authentication options. A verification code input 36 receives a one time passcode. A verify and finish button 38 completes enrollment after verification. These elements are visually indicated by their reference numerals in FIG. 3.

In some embodiments, enrollment uses the data flow shown in FIG. 13. Employer admin device 100 interacts with employer portal UI 102 to configure or generate enrollment credentials via an enrollment and QR service 192. Enrollment and QR service 192 issues enrollment codes, QR payloads, and one time enrollment tokens tied to an employer tenant. In some embodiments, employee mobile device 10 interacts with mobile client application 12 to submit enrollment credentials to an MFA verification service 194. In some embodiments, employer portal UI 102 also interacts with MFA verification service 194 to approve, validate, or reconcile enrollment actions, including where enrollment is employer initiated.

In some embodiments, successful verification causes MFA verification service 194 to signal device API controller 162 to provision device credentials, device keys, device certificates, or a combination. In some embodiments, key management service 202 generates, stores, rotates, or revokes cryptographic material used to authenticate device telemetry and to secure sensitive integration credentials. Tenant configuration store 204 stores enrollment state, policy configuration, payroll provider settings, and program settings, on a per tenant basis. These elements are shown and labeled in FIG. 13.

In some embodiments, the registration workflow results in a device identifier, a tenant identifier, and an employee identifier being linked. The resulting linkage can be used to receive timekeeping events for the employee from external systems, receive device engagement telemetry from the enrolled employee mobile device 10, and generate payroll adjustment records for the correct employee record in payroll provider system 188.

In some embodiments, the system supports re enrollment, such as when an employee changes devices or when an employer changes payroll providers. In some embodiments, backend platform 160 maintains historical links in audit log store 184 while enforcing tenant policies concerning retention and access.

In some embodiments, the system supports enrollment for different classes of users, including hourly employees, salaried employees, contractors, or students, while still generating payroll actionable or compensation actionable records in payroll provider system 188, in out time system 190, or other authoritative systems.

Incentive Enrollment and Consent

Figure 4:
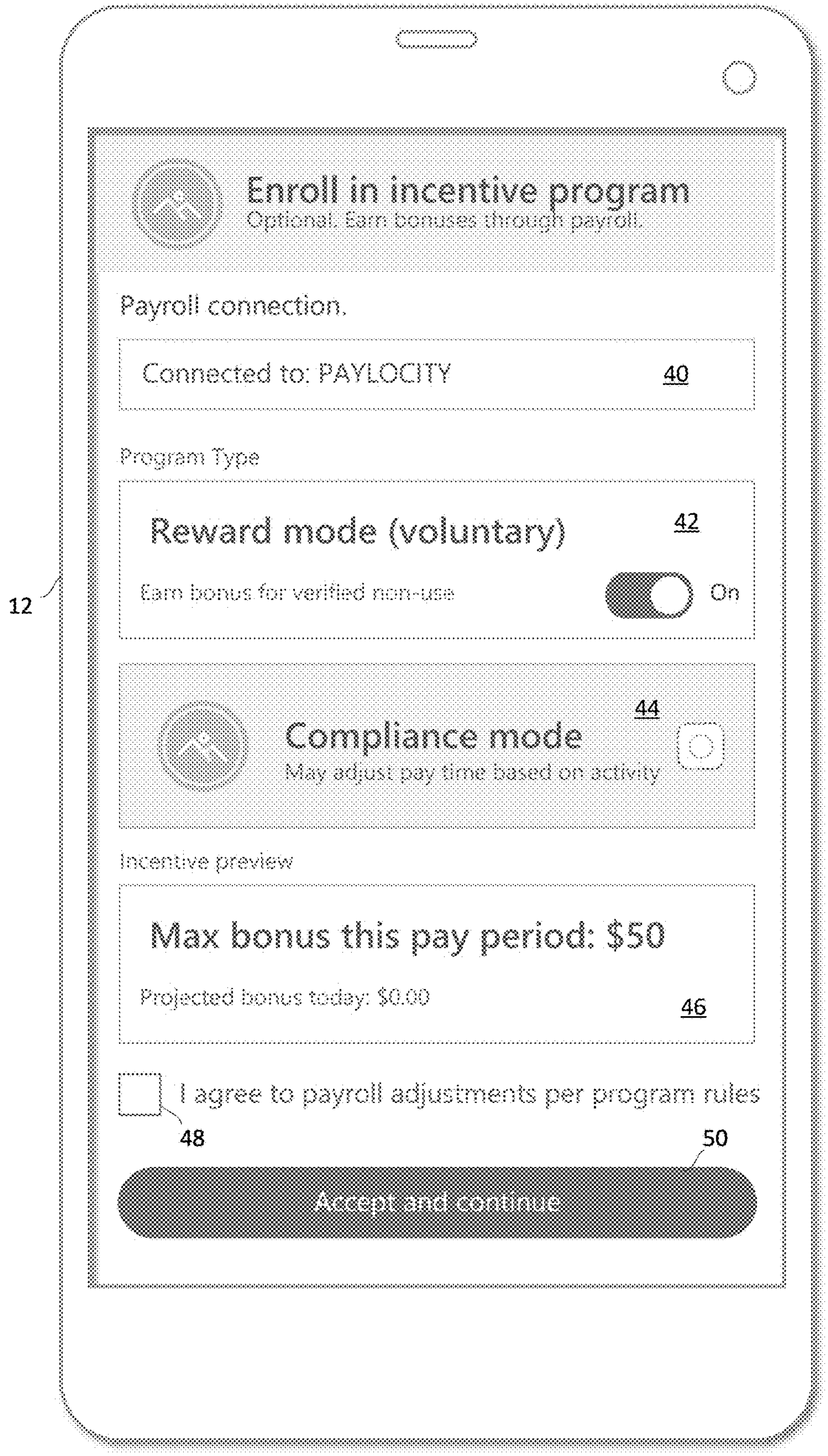
FIG. 4 is a front view of an enrollment interface for selecting an incentive mode and providing consent for payroll adjustments under defined program rules.

FIG. 4 illustrates an incentive enrollment interface presented on employee mobile device 10. In the illustrated embodiment, a payroll connection indicator 40 displays the payroll provider associated with the employee, such as a provider name, provider type, or provider account. A program type interface includes a reward mode toggle 42 and a compliance mode selector 44. An incentive preview panel 46 presents an estimated or maximum incentive for a pay period. A payroll adjustment consent checkbox 48 records employee consent to payroll adjustments under defined program rules. An accept and continue button 50 activates enrollment for the selected program type. These elements are visually indicated by their reference numerals in FIG. 4.

In some embodiments, prior to activating device engagement telemetry collection, restriction enforcement, or payroll adjustment generation for an employee, mobile client application 12 presents a tracking disclosure interface that identifies at least: (i) categories of data processed (for example, category-level usage metrics and event indicators), (ii) a temporal scope of processing (for example, only during a controlled work interval and not during break intervals and not outside monitored work intervals), (iii) access scope (for example, which employer roles may view summaries), (iv) retention settings, and (v) an explanation that the tracked data fields are used for program administration and payroll-linked incentives. In some embodiments, the disclosure interface indicates that employees should not expect privacy with respect to the disclosed tracked data fields, while still withholding prohibited data fields as described herein.

In some embodiments, the tracking disclosure interface collects an affirmative acknowledgment prior to enrollment activation, including at least one of: a typed-name signature, a drawn signature, a device-mediated acknowledgment action, or a multi-factor acknowledgment code. In some embodiments, backend platform 160 stores a tracking disclosure record including an employee identifier, a tenant identifier, a disclosure version identifier, a policy version identifier, an acknowledgment timestamp, and a cryptographic hash or signature of presented disclosure content for auditability. In some embodiments, backend platform 160 prevents enrollment activation, suppresses telemetry ingestion, and suppresses payroll adjustment generation unless a valid tracking disclosure record exists for the employee and policy version.

In some embodiments, when an employer modifies a configuration that changes tracking scope, break handling, retention, permitted categories, or payroll adjustment rules, backend platform 160 transitions the employee to a re-consent required state and prompts the employee to acknowledge an updated disclosure version prior to continuing telemetry processing for payroll-linked outcomes. In some embodiments, an employee revocation action disables further telemetry collection and suppresses generation of new payroll adjustment records while preserving already transmitted payroll adjustment records and audit records as immutable.

In some embodiments, reward mode is a voluntary incentive configuration in which compliance is measured and payroll incentives are awarded when compliance meets a defined threshold, while payroll is not reduced for non-compliance. In some embodiments, compliance mode is a punitive configuration in which excessive non-work engagement can result in payroll deductions, paid-time deductions, time classification changes, or combinations thereof, subject to employer policy and applicable legal constraints.

In some embodiments, backend platform 160 stores an enrollment indicator corresponding to a payroll period, an incentive period, or both. In such embodiments, generation of payroll adjustment records is conditioned on the enrollment indicator so that payroll adjustments are generated only when an employee is enrolled, such as by voluntary enrollment under a defined program rule set.

In some embodiments, the system supports changes to enrollment, such as pausing participation or switching between reward mode and compliance mode based on employer settings. In some embodiments, changes to program type require additional consent or employer approval, and corresponding changes are recorded in audit log store 184.

In some embodiments, initiation of a break interval causes mobile client application 12 to enter a break privacy mode in which device engagement telemetry collection and transmission is suspended for the break interval. In some embodiments, the device transmits only a break marker indicating break start and break end (or a break-duration value) without transmitting category-level usage metrics or non-work interaction event indicators for the break interval, thereby reducing monitoring of nonworking time.

In some embodiments, break privacy mode is enforced as a hard privacy constraint such that employer-visible telemetry for break intervals is limited to break markers and, where enabled, a break interruption indicator as described herein, while category-level usage metrics and non-work interaction event indicators are not collected for break intervals or are discarded on-device prior to transmission. This reduces monitoring of nonworking time while still supporting break-boundary reconciliation and timekeeping review workflows.

In some embodiments, break privacy mode is activated responsive to (i) a break record received from in-out time system 190, (ii) a break action event triggered by start break button 72, or (iii) both, and the system reconciles the break boundaries using authoritative timekeeping records when available.

In some embodiments, break aggregation engine 198 supports one or more protected break types that are excluded from compliance scoring and excluded from punitive adjustment eligibility, including a nursing break type for nursing employees. A protected break type can be initiated by an employee through mobile client application 12 using a protected break selector, and or identified by a timekeeping code received from in-out time system 190 or payroll provider system 188. In some embodiments, when a protected break type is active, mobile client application 12 enforces break privacy mode and backend platform 160 stores only break markers and a protected break type code, while suppressing category-level telemetry and suppressing any adverse compliance scoring for the interval.

In some embodiments, the protected break type is used to generate reminders or scheduling prompts without disclosing sensitive details, for example by notifying the employee when a configured eligibility window is approaching while withholding the underlying reason from employer summaries unless a tenant role configuration explicitly allows such access.

Employee Dashboards, Controlled Work Intervals, and Exception Annotation

Figure 5:
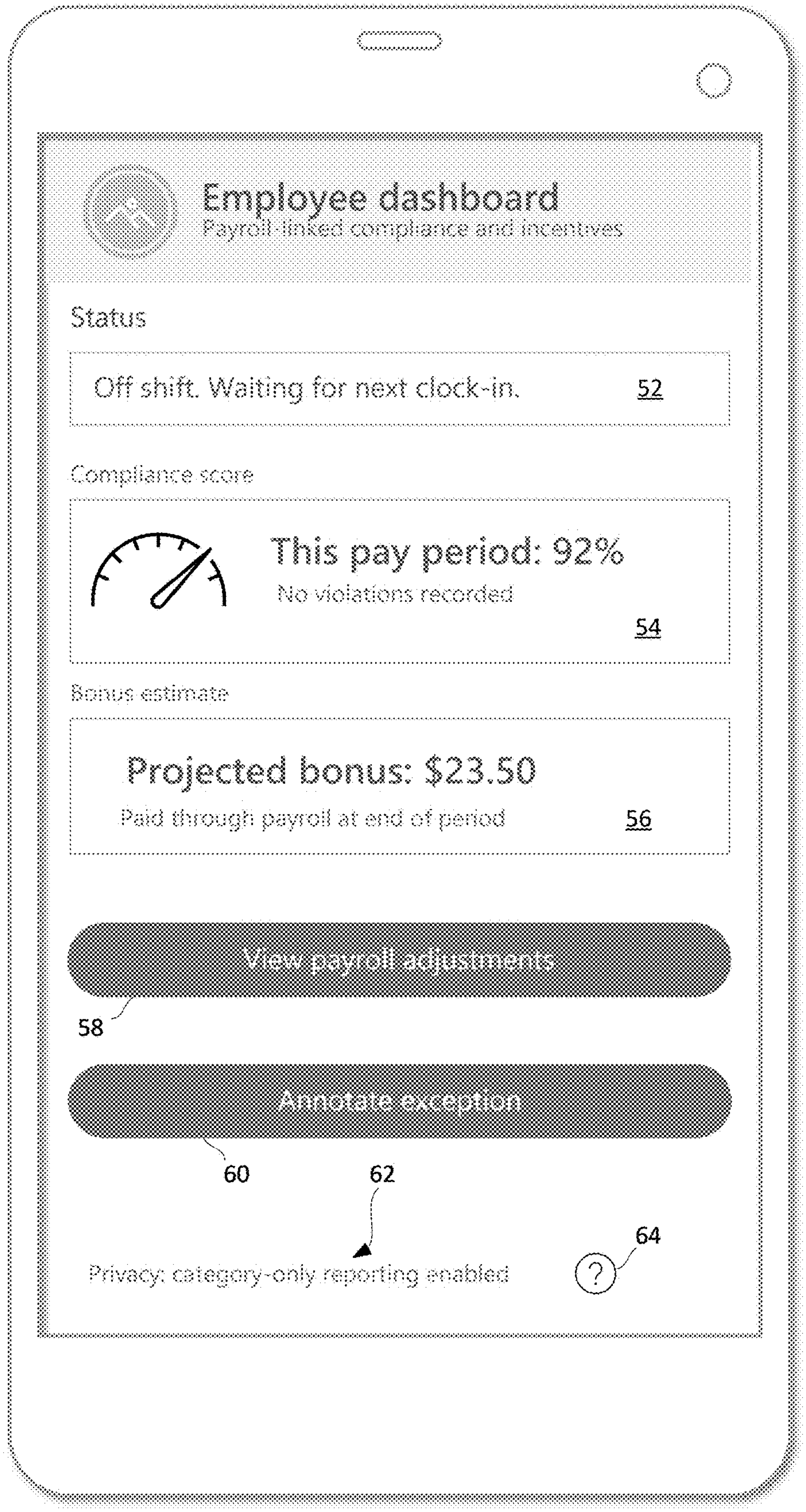
FIG. 5 is a front view of an employee dashboard interface presenting compliance information and a projected payroll-linked incentive amount.

FIG. 5 illustrates an employee dashboard interface. In the illustrated embodiment, a shift status indicator 52 indicates whether the employee is off shift or on shift and whether compliance tracking is active. A compliance score display 54 presents a compliance score for a pay period, shift, or other interval. A bonus estimate display 56 presents a projected bonus or incentive amount. A view payroll adjustments button 58 navigates to an interface showing payroll adjustments generated by the system. An annotate exception button 60 navigates to an interface allowing the employee to submit exception information that may exclude certain telemetry from scoring. A privacy notice text 62 and a privacy info icon 64 provide user facing notice that the system uses category only or privacy preserving telemetry. In some embodiments (not shown), the dashboard further includes a bonus and deduction grid that places the employee into a current tier or cell based on real-time compliance and policy thresholds, and the interface renders real-time feedback indicators, such as emoji or icon cues, when a bonus is earned, when a punitive time classification or deduction is triggered, and when an exception is approved. These elements are visually indicated by their reference numerals in FIG. 5.

Figure 6:
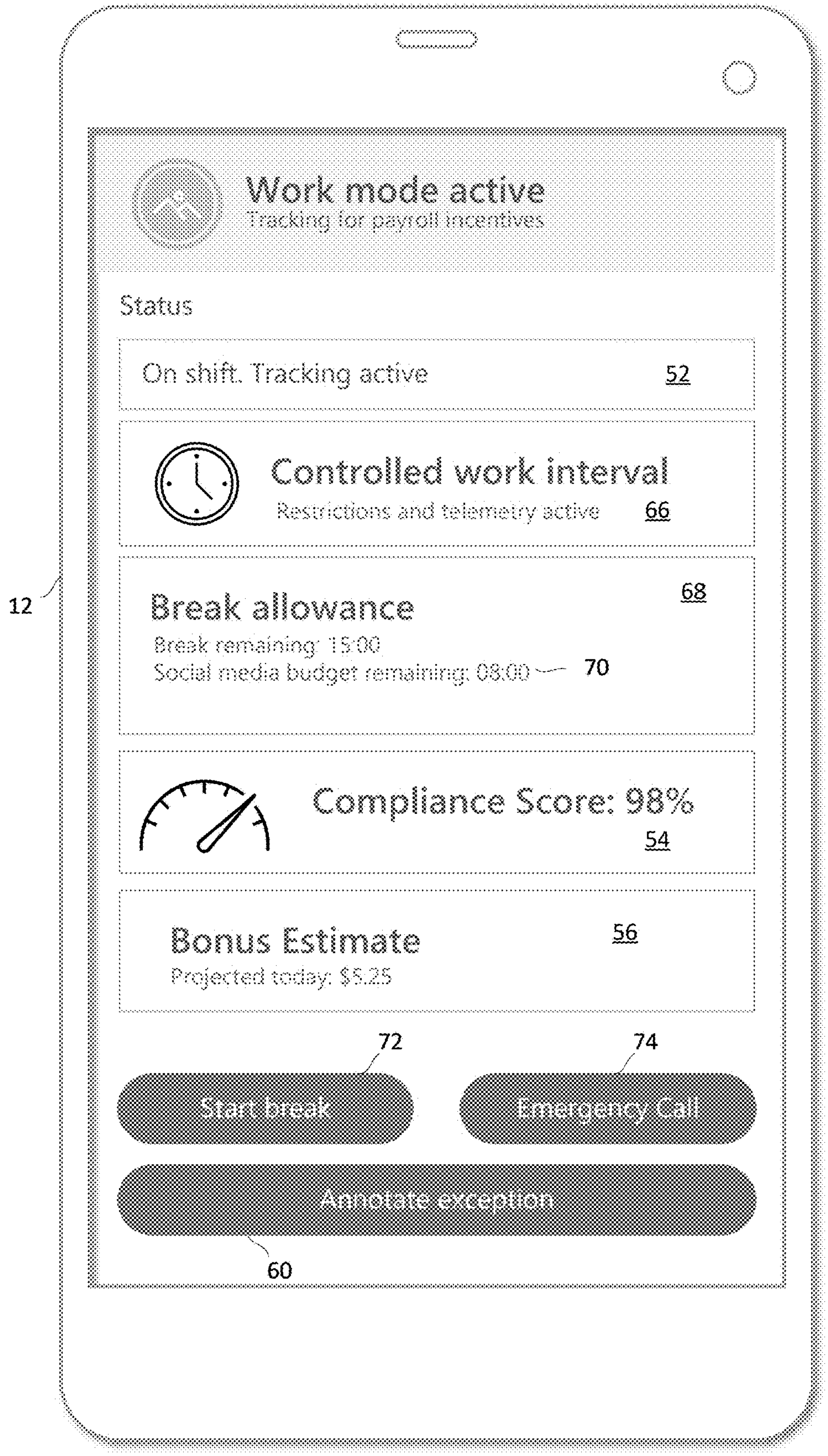
FIG. 6 is a front view of a work mode interface showing an active controlled work interval, break allowances, and compliance status.

FIG. 6 illustrates a work mode interface. In the illustrated embodiment, controlled work interval panel 66 indicates that restrictions and telemetry are active during a controlled work interval. Break allowance indicator 68 indicates break time remaining. Category budget indicator 70 indicates a remaining non work budget for a category, such as social media, messaging, or entertainment. A start break button 72 allows a user to initiate a break interval. An emergency call button 74 provides a permitted communication channel during restrictions. These elements are visually indicated by their reference numerals in FIG. 6. In some embodiments, start break button 72 triggers the mobile client application 12 to create a break action event that is transmitted to backend platform 160 and used to adjust scoring. In some embodiments, break initiation is reconciled against break records received from in out time system 190 to preserve the authoritative nature of payroll and timekeeping systems while still allowing employee initiated break interactions for compliance handling. In some embodiments (not shown), when the employee is clocked in and a driving-state indicator indicates vehicle movement, mobile client application 12 transitions into a driving restriction state for the driving sub-interval and applies a more restrictive device policy than a non-driving work interval.

In some embodiments, activation of emergency call button 74 is treated as an allowed interaction or is automatically recorded as an exception event, thereby preventing an emergency communication from unfairly decreasing a compliance score. In some embodiments, emergency calling remains available regardless of restriction state, including to emergency services numbers such as 911. In some embodiments, the system further supports an allowlist mechanism in which one or more permitted contacts, phone numbers, or communication identifiers are designated as eligible to bypass certain restrictions during a controlled work interval or a driving sub-interval. For privacy, allowlist entries can be stored and evaluated using hashed phone numbers or other non-reversible tokens rather than contact names. In some embodiments, the device policy is allowlist-based for applications and/or phone numbers, such that only specified applications and/or specified phone numbers are permitted during restricted periods and all others are blocked or deferred. In some embodiments, when a non-allowlisted communication is received during a controlled work interval, mobile client application 12 can queue delivery until the next break interval and/or send an automatic response indicating the employee is in a restricted work interval and will respond later, subject to employer configuration and applicable law.

Figure 7:
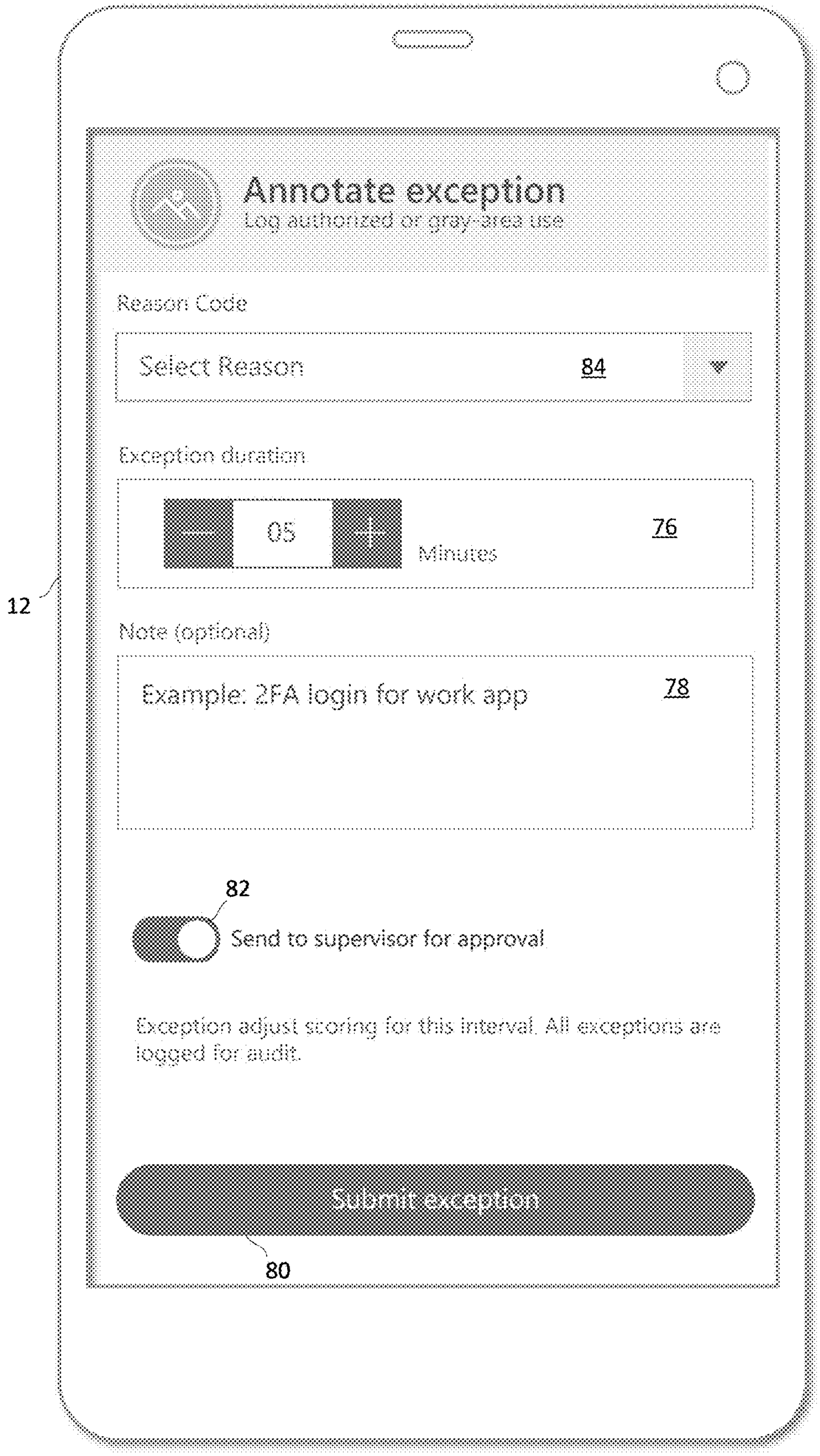
FIG. 7 is a front view of an exception annotation interface for recording an authorized or approved exception interval affecting compliance scoring.

FIG. 7 illustrates an exception annotation interface. In the illustrated embodiment, a reason code selector 84 provides a structured reason, such as work related authentication, supervisor instruction, emergency communication, safety event, or other configured reasons. An exception duration control 76 records a duration of an exception interval. An exception note field 78 records optional explanatory text. A supervisor approval toggle 82 indicates whether the exception request should be forwarded for supervisor review. A submit exception button 80 transmits the exception request to backend platform 160. In some embodiments (not shown), each adjustment item is accompanied by a real-time feedback indicator, such as an emoji or icon cue, that distinguishes bonus items, punitive deductions or unpaid-time classifications, and approved exceptions. These elements are visually indicated by their reference numerals in FIG. 7.

In some embodiments, the exception request is stored in exception approval queue 196 or another data store for review by employer admin device 100 via employer portal UI 102. In such embodiments, when an exception request is approved, an approved annotation record is generated that identifies at least the employee, an exception interval, and an approval state. Analytics and scoring engine 180 can then exclude device engagement telemetry occurring during the approved exception interval from compliance scoring.

In some embodiments, tenant configuration store 204 stores one or more accommodation profiles or role-based policy profiles that modify exception handling and scoring for designated employees or job functions. For example, a designated profile can pre-approve specified exception reason codes, apply different category budgets, and record the applied policy version in audit log store 184 so that payroll treatment and compliance scoring can be reviewed without exposing prohibited telemetry fields.

In some embodiments, tenant configuration store 204 stores protected absence rules indicating that certain time away from work is protected or otherwise authorized such that an employee is not penalized for taking the time away. Protected absence rules can be configured to recognize protected absence codes and or leave classifications received from payroll provider system 188, in-out time system 190, or an external HR information system, including without limitation protected or authorized full-day absences, partial-day absences, intermittent leave, and extended breaks.

In some embodiments, backend platform 160 constructs protected absence intervals from received absence codes and excludes protected absence intervals from compliance scoring and from program eligibility conditions that would otherwise reduce or deny incentives. For example, where pooled rankings are computed, analytics and scoring engine 180 can normalize scores on a worked-hours basis such that protected absence time does not reduce a compliance score or ranking. In some embodiments, payroll adjustment engine 182 suppresses punitive adjustments and suppresses adverse eligibility outcomes for protected absence intervals, and routes any conflicting employer configuration to an employer review queue. In some embodiments, audit log store 184 stores a protected absence indicator and time bounds without storing sensitive medical or personal details associated with the protected absence.

In some embodiments, report issue button 94 initiates a time record verification workflow in which mobile client application 12 presents a summary of authoritative clock-in and clock-out records received from payroll provider system 188 (and any associated break records), along with any system-generated provisional closure timestamps if present.

The workflow enables the employee to either (i) affirm that the presented records reflect all hours worked or (ii) submit a correction request indicating that additional work occurred outside the presented times. In some embodiments, completion of the workflow creates a time record attestation record stored in audit log store 184.

In some embodiments, employer portal UI 102 presents a corresponding time-attestation status indicator for a workforce segment, enabling an employer to identify missing attestations, open correction requests, or unresolved provisional closures prior to payroll batch submission.

In some embodiments, the exception system is used to prevent unfair scoring outcomes. For example, a required two factor authentication interaction within a work application can be submitted as an exception so that it does not count as non work engagement.

Figure 8:
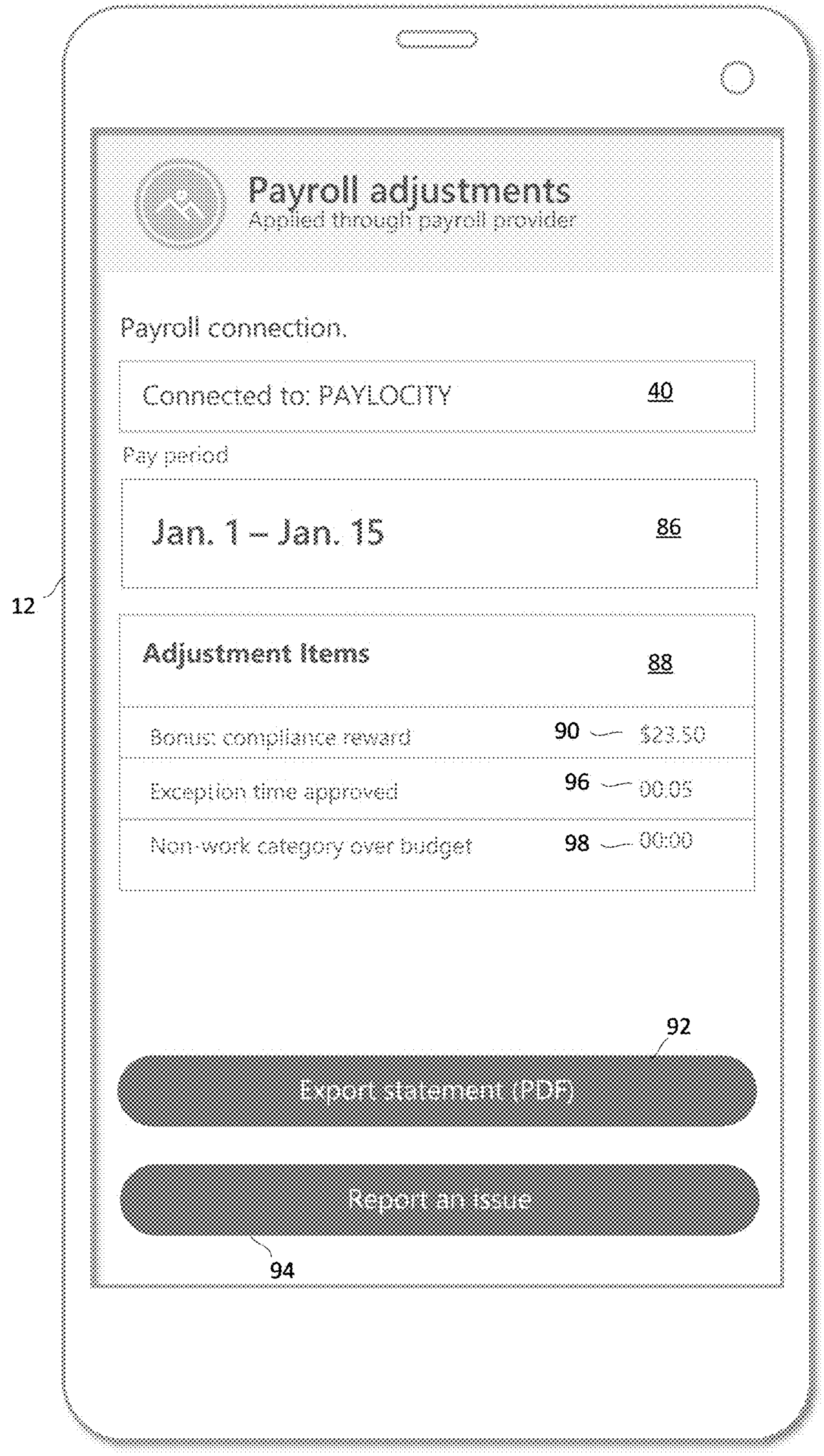
FIG. 8 is a front view of a payroll adjustments interface presenting payroll adjustment items generated based on compliance scoring and exceptions.

FIG. 8 illustrates a payroll adjustments interface. In the illustrated embodiment, a pay period selector 86 selects a pay period. An adjustment items list 88 lists one or more payroll adjustment items generated by backend platform 160. In the illustrated embodiment, the items include a bonus adjustment item 90 representing a reward, an exception time adjustment item 96 representing an approved exception classification, and a non work budget adjustment item 98 representing a classification or deduction associated with exceeding a non work budget. An export statement button 92 generates a report or statement for the employee, such as a portable document format statement that describes adjustments in a payroll actionable form. A report issue button 94 initiates a dispute workflow or opens an issue submission flow for investigating a scoring or payroll adjustment discrepancy. These elements are visually indicated by their reference numerals in FIG. 8.

In some embodiments, the employee side interfaces in FIGS. 1 through 8 are rendered on a smartphone display, but the disclosed techniques are not limited to smartphones and can be applied to tablets (including iPads), laptops, desktop computers, kiosks, or other devices capable of collecting device engagement telemetry and enforcing restriction policies. In such embodiments, the client application can be implemented as a native application, a managed profile agent, a browser extension, or another enforceable client component.

In some embodiments, mobile client application 12 and employer portal UI 102 implement accessibility features enabling use by blind and other disabled employees. For example, user interface controls expose screen-reader accessible labels, focus order, and interaction hints; support large-text and high-contrast rendering; support voice-control and external keyboard navigation; and provide non-visual feedback for compliance indicators using haptic patterns and audio cues. In some embodiments, emergency calling and break initiation controls are rendered in an accessibility-prioritized layout to reduce fine-motor requirements.

In some embodiments, the system provides an alternative submission channel for one or more of enrollment, time attestation, exception annotation, and time correction requests, including without limitation a web portal flow, SMS flow, interactive voice response flow, or kiosk mode, enabling employees who cannot operate a mobile interface to complete required actions without loss of access to timekeeping and dispute-resolution workflows.

Employer Dashboards, Approvals, and Pooled Distributions

Figure 9:
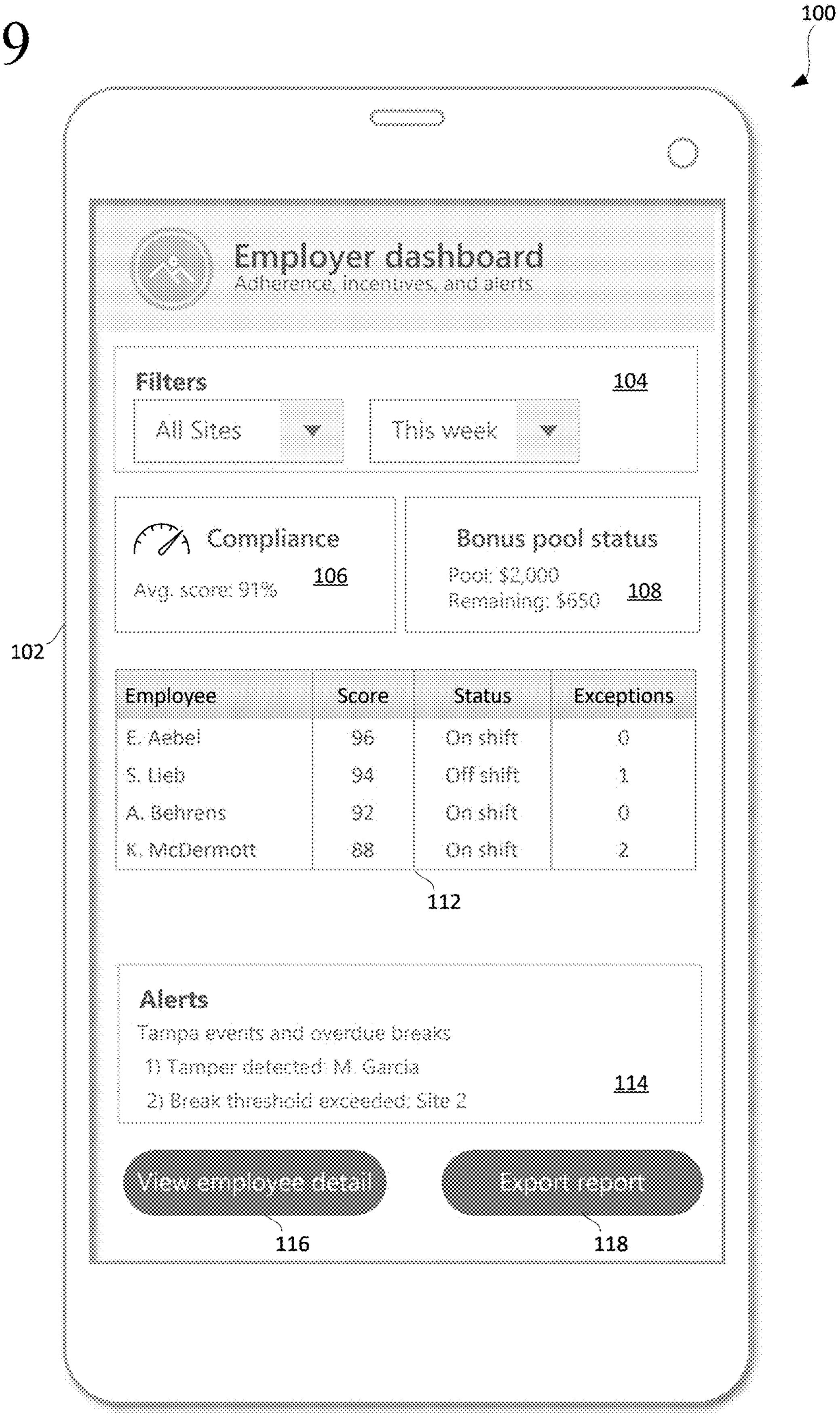
FIG. 9 is a front view of an employer dashboard interface presenting employee compliance summaries, bonus pool information, and administrative alerts.

FIG. 9 illustrates an employer dashboard interface presented on employer admin device 100 via employer portal user interface 102. In the illustrated embodiment, a filters panel 104 allows filtering by organizational scope and time window, for example, by site and by week. A compliance summary widget 106 presents aggregated compliance information for a selected workforce segment. A bonus pool status widget 108 presents information associated with a configured bonus pool for an incentive period, for example, a pool amount and a remaining amount. An employee list table 112 lists employees and corresponding compliance scores, on-shift status, and exception counts. An alerts panel 114 presents administrative alerts, for example, tamper events, break-related alerts, and above-threshold compliance situations for specific employees (for example, repeated non-work violations, repeated punitive deductions, or driving-mode violations) in real time. In some embodiments, alerts panel 114 is backed by a notification service that pushes employer alerts to employer admin device 100 as events are detected. A view employee detail button 116 navigates to an employee detail interface, and an export report button 118 outputs a report suitable for operational review, audit, or payroll reconciliation.

Figure 10:
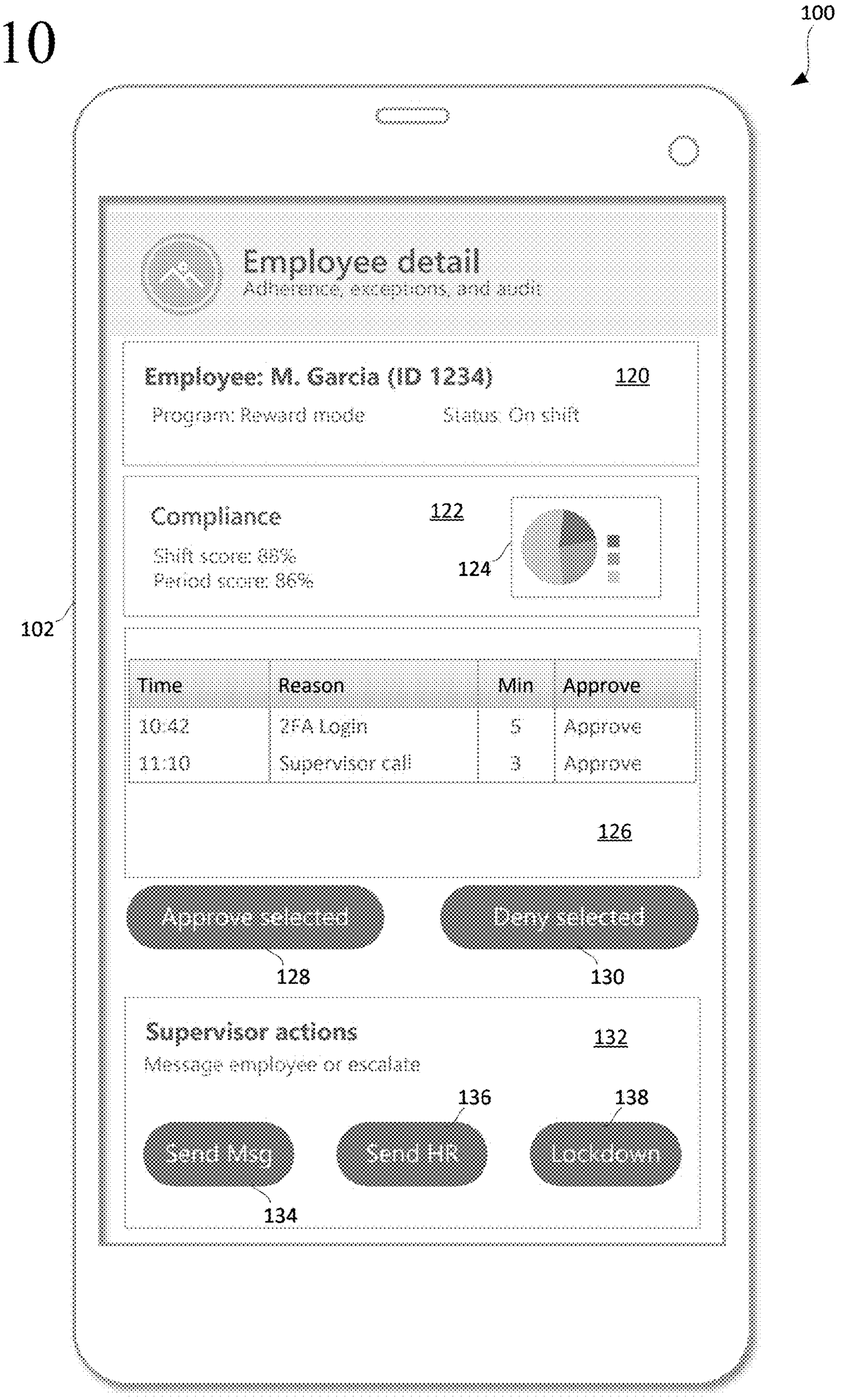
FIG. 10 is a front view of an employer employee-detail interface presenting employee compliance details, an exception log, and approval controls.

FIG. 10 illustrates an employee detail interface presented on employer admin device 100 via employer portal user interface 102. In the illustrated embodiment, an employee header panel 120 identifies the employee and can indicate program mode and shift status. A compliance summary panel 122 presents compliance measures for a shift and for a defined period. A compliance chart widget 124 provides a graphical summary. An exception log table 126 lists exception entries with time, reason, and duration and can present per-entry approval indicators. An approve selected button 128 and a deny selected button 130 allow approval or denial of selected exception entries. A supervisor actions panel 132 provides communication and escalation controls, including a send message button 134, a send HR button 136, and a lockdown button 138.

In some embodiments, approvals affect compliance scoring and therefore the resulting payroll adjustment records generated for the employee, as further described below with respect to FIG. 17. In some embodiments, lockdown button 138 triggers a restriction escalation, such as a lockdown policy update 224 issued to employee mobile device 10 as shown in FIG. 18, thereby integrating employer supervision actions with device policy enforcement.

Figure 11:
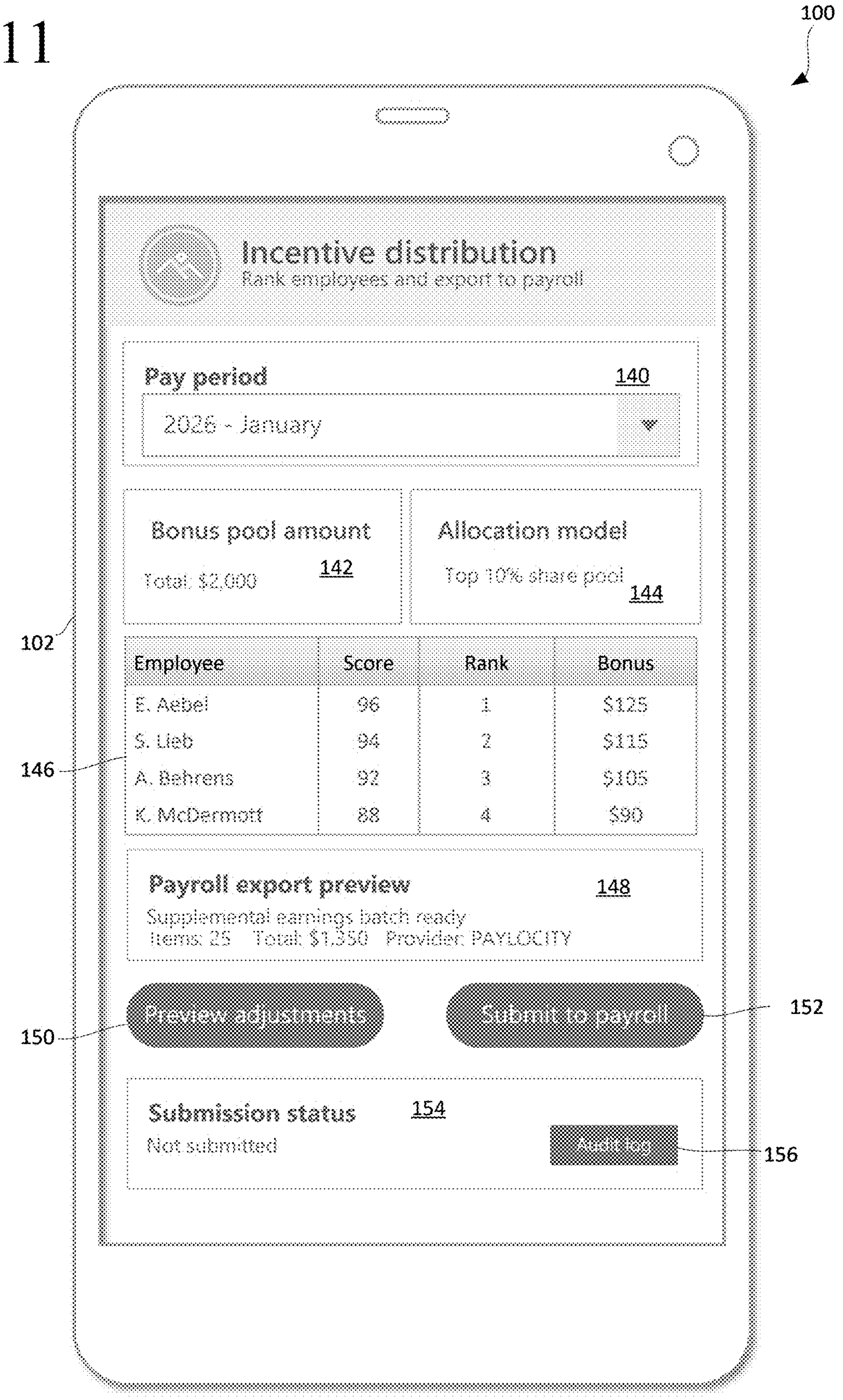
FIG. 11 is a front view of an employer incentive distribution interface for allocating a bonus pool and submitting resulting payroll adjustments to a payroll provider.

FIG. 11 illustrates an incentive distribution interface. In the illustrated embodiment, a pay period selector 140 selects an incentive period. A bonus pool amount field 142 indicates a total pool amount for distribution. An allocation model selector 144 selects an allocation rule, such as a top percentage share pool, a tiered allocation, or a proportional distribution. An incentive distribution table 146 lists employees, compliance scores, rankings, and allocated bonus amounts. A payroll export preview panel 148 summarizes the payroll export batch and identifies the payroll provider. A preview adjustments button 150 allows an employer to review computed adjustments. A submit to payroll button 152 transmits payroll adjustment records or a payroll batch to payroll provider system 188. A submission status panel 154 indicates whether submissions have completed. An audit log control 156 provides access to audit records. These elements are visually indicated by their reference numerals in FIG. 11.

In some embodiments, pooled incentives are configured so that a fixed pool amount is distributed among top-ranked compliant employees during a month, quarter, or other defined incentive period. In some embodiments, pooled incentives are combined with individual bonuses and are enforced via payroll adjustment records that identify supplemental earnings codes, bonus codes, or other provider-supported earnings identifiers for payroll provider system 188. In some embodiments, the pool amount is configured to be cash-neutral by funding the pool from amounts associated with unpaid time classifications and/or deductions assessed for non-compliance, thereby offsetting incentive payouts without increasing the employer's net payroll expense.

In some embodiments, employer portal UI 102 provides privacy controls and views that show only category level summaries or aggregated compliance scores, while restricting access to finer detail to authorized roles. In some embodiments, employer roles and permissions are controlled via tenant configuration store 204.

System Architecture and Integration Overview

FIG. 12 is a block diagram showing interactions among employee devices, employer systems, a middleware platform, and external timekeeping and payroll provider systems. In the illustrated embodiment, employee mobile device 10 communicates with backend platform 160. On device telemetry firewall 176 provides privacy preserving filtering prior to communication. Employer admin device 100 communicates with backend platform 160 via employer portal UI 102. In out time system 190 provides timekeeping records including clock in records, clock out records, break records, edits, or other timekeeping events. Integration adapters 166 ingest these records and normalize them for use by backend platform 160. Backend platform 160 includes payroll adjustment engine 182 that generates payroll adjustment records transmitted to payroll provider system 188. Notification service 186 delivers notifications to employer portal UI 102 and or to employee mobile device 10. Audit log store 184 stores audit trails relating to enrollment, telemetry, scoring, exception approvals, payroll adjustment generation, and payroll submission. These components are labeled in FIG. 12.

In some embodiments, in out time system 190 and payroll provider system 188 are separate vendor systems. In other embodiments, timekeeping and payroll are integrated in one vendor system. Integration adapters 166 can support either deployment by mapping vendor APIs to canonical event types and canonical payroll adjustment formats.

In some embodiments, backend platform 160 integrates with multiple payroll providers by using multiple integration adapters 166, each configured to authenticate with a respective payroll provider and to translate between a canonical payroll adjustment record format and a provider specific format. In some embodiments, the system supports both real time and batch processing. For example, timekeeping events can trigger real time restriction commands and scoring updates, while payroll adjustment submissions can occur in batches per payroll period, as shown by payroll batch submission 208 in FIG. 16.

Timekeeping Ingestion, Normalization, and Restriction Issuance

Figure 14:
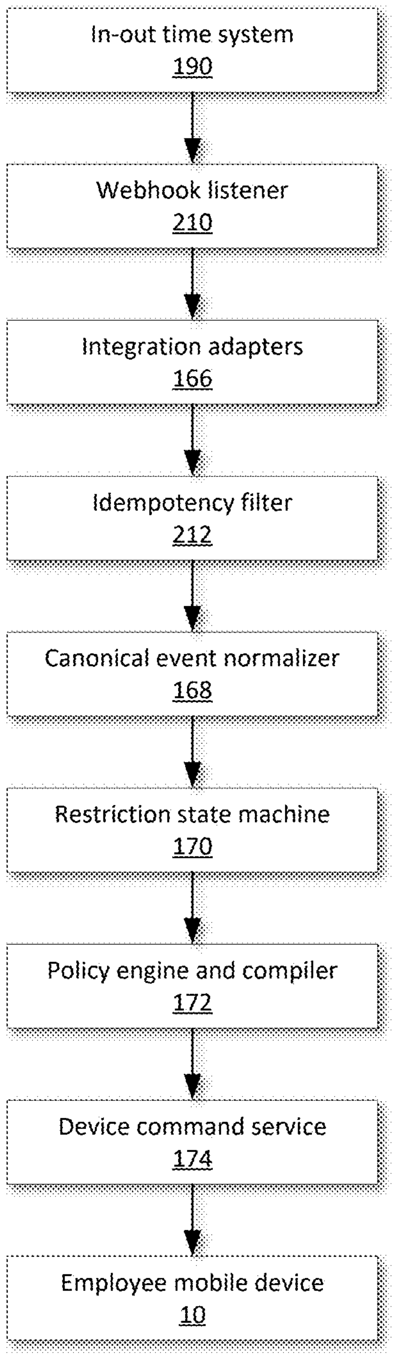
FIG. 14 is a flow diagram showing ingestion of an authenticated clock-in event and issuance of a restriction command to an employee device.

FIG. 14 illustrates an example flow for ingesting timekeeping events and issuing device restriction commands. In the illustrated embodiment, in out time system 190 transmits timekeeping events to webhook listener 210. Webhook listener 210 authenticates incoming webhook events using a shared secret, a signature, a certificate, or other authentication mechanism. Integration adapters 166 parse vendor specific timekeeping events, map vendor specific fields to canonical fields, and forward canonical event representations for processing. Idempotency filter 212 generates or extracts an idempotency key per event to suppress duplicate processing. Canonical event normalizer 168 normalizes vendor specific timekeeping events into canonical event records, such as a canonical clock in record, a canonical clock out record, a canonical break start record, and a canonical break end record. Restriction state machine 170 transitions a device restriction state based on canonical events. Policy engine and compiler 172 determines a device policy to apply based on tenant configuration, employee role, jurisdictional constraints, break rules, and the selected program type. Device command service 174 transmits device commands to employee mobile device 10. These components are labeled in FIG. 14.

In some embodiments, canonical event normalizer 168 also corrects for time zones, delayed events, missing fields, or other inconsistencies. By way of example, if a timekeeping event is received in a vendor specific local time and not annotated with an explicit offset, canonical event normalizer 168 can apply a tenant configured time zone from tenant configuration store 204 and record the applied time zone normalization in audit log store 184.

In some embodiments, idempotency filter 212 stores idempotency keys in a data store to detect duplicates and to prevent repeated work interval transitions. In some embodiments, an idempotency key is derived from one or more of: employee identifier, source provider identifier, event type, event timestamp, and a vendor event identifier. In some embodiments, idempotency filter 212 uses a time window and a canonicalized representation to handle vendor corrections and retransmissions. In some embodiments, the stored idempotency key also includes a payload hash to detect changes to event content.

In some embodiments, restriction enforcement is configured so that it does not prevent access to timekeeping functions needed to maintain accurate work-time records. For example, the compiled policy can be configured to keep timekeeping functions, employer scheduling functions, and correction-request functions accessible during a controlled work interval, including access to clock-out and break-clock actions and access to a correction submission interface, thereby reducing risk that enforcement actions interfere with accurate hours-worked recording.

In some embodiments, restriction state machine 170 and policy engine and compiler 172 are configured so that device restriction enforcement is not used to prevent an employee from recording working time, including clocking in prior to a scheduled start time or recording additional working time beyond a scheduled end time. In such embodiments, when a clock-in record or work interval segment is received outside a scheduled window, backend platform 160 tags the interval as an unscheduled work interval and may notify an employer approver for scheduling review, while maintaining the received timekeeping records as authoritative for compensation and without automatically truncating or reducing recorded hours worked.

In some embodiments, mobile client application 12 presents an employee prompt when an unscheduled interval is detected, enabling the employee to confirm that work is being performed and to complete a timekeeping action or a correction submission workflow, thereby increasing accuracy of hours-worked records without preventing time entry.

In some embodiments, restriction state machine 170 transitions among states including off shift, on shift restricted, break state, exception state, and lockdown state. These state transitions can be driven by canonical events, by break aggregation engine 198, by approved exceptions, by a driving-state indicator received from employee mobile device 10, or by tamper events as described further below.

In some embodiments, policy engine and compiler 172 compiles a tenant policy into a device executable configuration, such as a set of allowed categories, blocked categories, notification rules, break allowances, and emergency exceptions, allowlisted applications, and allowlisted phone numbers. In some embodiments, the compiled policy includes a driving safety policy profile that is applied during driving intervals and is more restrictive than a non-driving work profile. In some embodiments, device command service 174 transmits commands including enabling a restricted mode, enforcing a permitted application list, limiting non work categories, setting break allowances, enabling an emergency communication channel, and issuing a lockdown policy update 224.

In some embodiments, a restriction command does not necessarily remove device functionality, but can instead activate telemetry monitoring and present user interface notifications to establish that the work interval is being measured for payroll purposes. In some embodiments, restriction enforcement uses device management APIs, operating system focus modes, managed profiles, or other mechanisms available on the employee mobile device.

In some embodiments, timekeeping ingestion supports edits and corrections. For example, when an employer corrects a clock out time, canonical event normalizer 168 can update a monitored work interval and trigger recalculation of compliance scoring and payroll adjustments in a deterministic manner, while audit log store 184 records the reason for the recalculation. This supports deterministic outcomes needed for payroll trust.

In some embodiments, when a clock-out record is missing and the monitored work interval reaches a tenant configured maximum shift length, backend platform 160 closes the interval in a provisional closure state for purposes of restriction state management and telemetry windowing, while preserving the interval as unresolved for payroll-impacting determinations until verification occurs. In some embodiments, the provisional closure state is recorded in audit log store 184 with a reason code indicating that the closure was system-generated due to a missing clock-out record.

In some embodiments, upon entering the provisional closure state, notification service 186 transmits a notice to employee mobile device 10 and to employer admin device 100 indicating that a clock-out record is missing or late and that review is requested. In some embodiments, the notice includes (i) the provisional closure timestamp, (ii) the last received authoritative timekeeping event timestamp, and (iii) one or more corroborating signals such as a proximity indicator or a device restriction state transition timestamp, without exposing prohibited telemetry fields.

In some embodiments, for employees designated in tenant configuration store 204 as nonexempt, payroll adjustment engine 182 suppresses transmission of any payroll adjustment record that would reduce compensation, reduce recorded paid minutes, or reclassify minutes from paid to unpaid, where such adjustment depends on a provisional closure timestamp or an unverified system-generated clock-out time. Instead, the engine routes the affected item to an employer review queue and optionally requests employee attestation, thereby reducing risk of underpayment due to an automated default.

In some embodiments, when an authoritative clock-out record is later received, the system replaces the provisional closure state with the authoritative closure, triggers deterministic recalculation of compliance scoring and any pending payroll adjustment records, and records a linkage between the provisional closure and the authoritative closure in audit log store 184 to support audit and dispute handling.

In some embodiments, the system generates a time correction suggestion record that is distinct from a payroll adjustment record, the time correction suggestion record proposing a corrected clock-out time or a request for time-card review based on corroborating signals (for example, proximity indicator changes or verified device restriction transitions). In some embodiments, the time correction suggestion record is transmitted to an in-out time system 190 or payroll provider system 188 only upon employer approval, thereby maintaining the external timekeeping system as authoritative.

Determining Monitored Work Intervals

In some embodiments, backend platform 160 determines a monitored work interval for an employee based on timekeeping records that include at least a clock-in timestamp and a clock-out timestamp. The monitored work interval may be represented as a start time, an end time, an employee identifier, a tenant identifier, and state annotations such as whether the interval is subject to telemetry tracking, restrictions, break handling, or approved exceptions.

In some embodiments, the monitored work interval is determined from canonical event records rather than raw vendor records. For example, the canonical event normalizer 168 may produce a canonical clock in record and a canonical clock out record, and an interval constructor component within backend platform 160 uses those canonical records to produce a monitored work interval object.

In some embodiments, the interval constructor handles edge cases including: a missing clock out record, in which case the monitored work interval remains open and may be closed when the clock out record is later received, or may be closed at a tenant configured maximum shift length; duplicate clock in records, in which case idempotency filter 212 suppresses duplicates; out of order events, in which case canonical event normalizer 168 reorders based on timestamps or vendor sequence identifiers; and corrections, in which case canonical event normalizer 168 emits a correction event and triggers deterministic recalculation.

In some embodiments, monitored work intervals are segmented for scoring purposes, for example by dividing a shift into fixed time windows and excluding break intervals and approved exception intervals from the scored windows. In some embodiments, compliance scoring is performed for at least a portion of the monitored work interval, such as for each segment, for each shift, and/or for each pay period.

Telemetry Collection, Privacy Preserving Filtering, and Scoring

FIG. 15 illustrates an example flow for privacy preserving telemetry collection and category only reporting used for compliance scoring. In the illustrated embodiment, employee mobile device 10 collects device engagement telemetry through mobile client application 12. On device telemetry firewall 176 enforces a telemetry schema and blocks prohibited data fields. Category dictionary mapping 216 maps application identifiers to category codes on the device, then discards the application identifiers prior to transmission. Telemetry ingestion API 178 receives the privacy preserving telemetry and stores telemetry in reporting and metrics store 206. Telemetry ingestion API 178 also stores an audit representation in audit log store 184. Analytics and scoring engine 180 computes a compliance score based on the received telemetry and a policy rule set. Employer admin device 100 receives summaries via employer portal UI 102. These components are labeled in FIG. 15.

In some embodiments, telemetry firewall 176 prevents transmission of application identifiers, message content, contact names, web content, and location coordinates while allowing transmission of category level metrics or event indicators needed for compliance scoring. For example, the telemetry payload may contain a category code and a duration value, but not the name of a specific social media application, and not any user content.

In some embodiments, category dictionary mapping 216 uses an on device mapping table that can be updated by backend platform 160 through a signed update. In some embodiments, the mapping table is tenant specific, allowing different employers to define category codes and category groupings suitable for their workplaces. In some embodiments, the mapping table includes a work category, communication category, social category, entertainment category, gaming category, shopping category, or other employer configured categories.

In some embodiments, device engagement telemetry includes category level usage metrics such as duration in a category during a time window, interaction counts, or a number of category switches. In some embodiments, device engagement telemetry includes non work interaction event indicators generated when a prohibited category is accessed, when an allowed budget is exceeded, when a device enters a restricted mode violation state, or other configured events occur. In driving-safety embodiments, device engagement telemetry further includes a driving-state indicator generated locally on employee mobile device 10 using GPS-derived speed and/or motion sensors to indicate that the employee mobile device 10 is in a driving condition, without transmitting raw location coordinates. These indicators can be used in scoring without reporting the underlying application identity.

In some embodiments, telemetry ingestion API 178 validates payload signatures or device tokens provisioned during enrollment, enforces rate limits, and stores telemetry in reporting and metrics store 206. In some embodiments, telemetry ingestion API 178 enforces schema validation such that any payload containing a prohibited field is rejected and recorded as a policy violation in audit log store 184. In some embodiments, mobile client application 12 transmits telemetry and receives device policy updates over one or more network transports including Wi-Fi, cellular data, VPN, and satellite connections. In some embodiments, when connectivity is unavailable, mobile client application 12 enforces restrictions locally and buffers telemetry for later upload when a permitted network becomes available.

In some embodiments, analytics and scoring engine 180 computes a compliance score based on received telemetry and a policy rule set. The compliance score can be computed per shift, per pay period, per work interval segment, or on another configured basis. In some embodiments, the compliance score is computed as a function of time in non work categories, number of non work interaction events, violations of a category budget, or combinations. For example, a compliance score may start at 100 and be reduced by a weighted penalty function for each minute above a social media budget and for each discrete violation event. In some embodiments, the compliance score is computed and stored along with a proof record including input telemetry hashes and policy identifiers for auditability.

In some embodiments, compliance scoring excludes telemetry during break intervals and approved exception intervals. Break intervals can be identified from timekeeping records received from in-out time system 190 and/or from employee-initiated break actions recorded through start break button 72. Approved exception intervals can be identified by approved annotation records originating from FIG. 7 and approved by an employer via employer portal UI 102, for example through the exception approval workflow shown in FIG. 17.

In some embodiments, analytics and scoring engine 180 provides compliance summaries to employer portal UI 102 and provides employee visible summaries to employee mobile device 10, such as compliance score display 54 and bonus estimate display 56.

In some embodiments, reporting and metrics store 206 stores aggregated metrics suitable for trend analysis, periodic reporting, and pooled incentive distribution calculations, while maintaining tenant isolation and access control.

Payroll Adjustment Record Generation and Payroll Provider Submission

Figure 16:
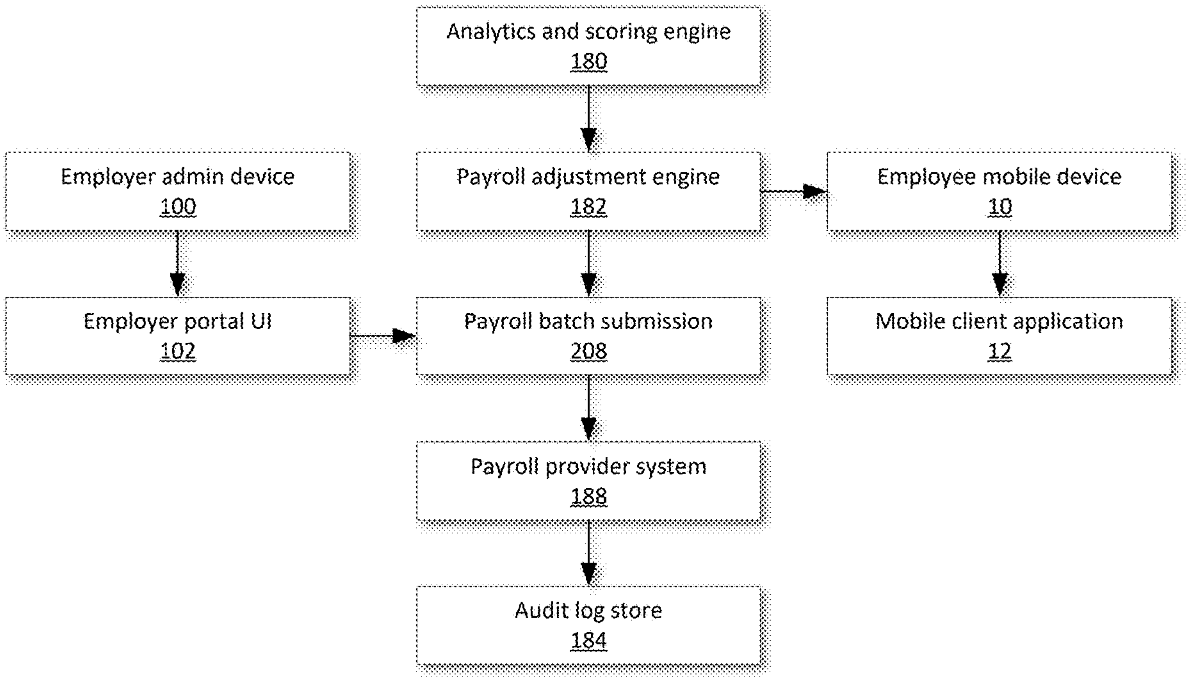
FIG. 16 is a flow diagram showing incentive calculation and generation of payroll adjustments for submission to a payroll provider.

FIG. 16 illustrates an example flow showing incentive calculation and generation of payroll adjustments for submission to a payroll provider. In the illustrated embodiment, analytics and scoring engine 180 provides compliance scores and related metrics to payroll adjustment engine 182. Payroll adjustment engine 182 generates payroll adjustment records and provides them to payroll batch submission 208 for submission to payroll provider system 188. Employer admin device 100, via employer portal UI 102, can initiate or control submission. Employee mobile device 10, via mobile client application 12, can receive notifications or summaries. Audit log store 184 stores audit records relating to submissions and results. These components are labeled in FIG. 16.

In some embodiments, payroll adjustment engine 182 generates a payroll adjustment record specifying at least one of a compensation adjustment or a paid-time classification adjustment. A compensation adjustment can be a bonus payment, a deduction, or another earnings adjustment recognized by payroll provider system 188. A paid-time classification adjustment can classify portions of time as unpaid time, paid time, break time, or other time classifications supported by payroll provider system 188.

In some embodiments, payroll adjustment engine 182 applies different models depending on enrollment and configuration. In reward mode, payroll adjustment engine 182 generates positive compensation adjustments when compliance meets a reward threshold and can be configured to exclude negative compensation adjustments. In punitive mode, payroll adjustment engine 182 can generate negative compensation adjustments, unpaid-time classifications, or both, when compliance fails to meet a configured compliance threshold, subject to employer policy and applicable constraints. In some embodiments, payroll adjustment engine 182 supports a cash-neutral incentive configuration in which amounts associated with unpaid-time classifications and/or deductions assessed for non-compliance are accumulated into a pool that funds bonuses for compliant employees, subject to tenant configuration and applicable law.

In some embodiments, when negative adjustments are enabled, payroll adjustment engine 182 applies wage-and-hour guardrails prior to submission. For example, the engine can evaluate whether a proposed deduction or unpaid-time designation would conflict with a tenant-configured wage floor, overtime computation rules, or an employee classification rule stored in tenant configuration store 204, and can respond by routing the item for employer review, converting the item to a non-monetary compliance record, and/or limiting enforcement to prospective device-policy changes.

In some embodiments, payroll adjustment engine 182 associates a compliance bonus payroll adjustment record with an overtime inclusion indicator indicating whether the bonus is intended to be treated as a nondiscretionary bonus for overtime regular-rate calculations for nonexempt employees. In some embodiments, integration adapters 166 map the overtime inclusion indicator to a provider-specific earnings code configured in tenant configuration store 204 as includable in the regular rate of pay. In some embodiments, where a bonus applies to multiple workweeks, payroll adjustment engine 182 generates an allocation record that apportions the bonus across workweeks based on hours worked or another configured allocation rule, and may generate an overtime true-up instruction record or supplemental provider entry where supported, thereby reducing risk of under-calculated overtime attributable to compliance bonuses.

In some embodiments, the employee classification rule includes at least an exemption-status indicator indicating whether the employee is treated as nonexempt or exempt for wage-and-hour purposes, and further includes one or more guardrail parameters including a minimum wage floor, a salary-basis floor, and a prohibited adjustment type set per employee classification.

In some embodiments, for an employee designated as exempt, payroll adjustment engine 182 suppresses any negative compensation adjustment that would reduce a guaranteed salary amount or otherwise conflict with a salary-basis rule. Instead, the engine converts the outcome to at least one of: (i) a non-monetary compliance record, (ii) a prospective device-policy change for future controlled work intervals, or (iii) an offset limited to discretionary incentive payments that are not part of a guaranteed salary, where such offset is enabled by tenant configuration.

In some embodiments, for an employee designated as nonexempt, payroll adjustment engine 182 evaluates a proposed negative compensation adjustment and or unpaid-time classification adjustment against a wage-floor rule such that, after applying the adjustment, computed straight-time wages remain at or above an applicable minimum wage for the relevant time window, for example a workweek or pay period, as configured. If the wage-floor rule would be breached, the engine reduces or suppresses the adjustment, converts the adjustment to a non-monetary compliance record, and or routes the adjustment to an employer review queue.

In some embodiments, to support a free-and-clear wage payment constraint, payroll adjustment engine 182 restricts negative adjustments to predefined program adjustment categories, such as forfeiture of a program bonus or an incentive offset, and blocks negative adjustments that would operate as a reimbursement or recovery of employer business costs unless an employer-specific authorization setting is configured and a compliance review state is satisfied. In some embodiments, each blocked, reduced, or rerouted adjustment is recorded in audit log store 184 with a policy version identifier and a guardrail reason code.

In some embodiments, payroll batch submission 208 groups payroll adjustment records for submission to payroll provider system 188, such as at the end of a pay period or on a configured schedule. In some embodiments, payroll batch submission 208 applies idempotency keys for payroll submissions so that repeated submission attempts do not create duplicate earnings entries in payroll provider system 188. For example, the submission idempotency key can be computed from employee identifier, pay period identifier, adjustment type, and amount or minutes, and stored such that retries are safe.

In some embodiments, employer portal UI 102 initiates submission of payroll adjustments, as shown in FIG. 11 by submit to payroll button 152. In other embodiments, submission occurs automatically based on tenant configuration and payroll cycle timing.

In some embodiments, payroll provider system 188 returns acknowledgments or errors. These are recorded in audit log store 184 and displayed via submission status panel 154, and optionally trigger notifications via notification service 186, thereby providing operational transparency and auditability.

In some embodiments, break aggregation engine 198 classifies break intervals into break types using tenant-configured thresholds and jurisdictional settings, for example classifying a short rest break type and a longer meal break type based on duration thresholds. In some embodiments, the thresholds include a first threshold corresponding to a short break duration and a second threshold corresponding to a meal break minimum duration, and the classified break type is provided to payroll adjustment engine 182 for use in paid or unpaid break classification where such classification is enabled.

In some embodiments, a first threshold corresponds to a short rest-break duration value and a second threshold corresponds to a meal-break minimum duration value, each configurable by jurisdiction. For example, the first threshold can be set to a value such as 20 minutes and the second threshold can be set to a value such as 30 minutes. In some embodiments, when a break interval duration is less than or equal to the short rest-break threshold, the system treats the interval as compensable time for nonexempt employees and suppresses generation of an unpaid break classification for the interval. In some embodiments, when a break interval duration meets or exceeds the meal-break minimum duration and no break interruption indicator is present, the system classifies the interval as a meal break type eligible for unpaid classification where such classification is enabled by tenant configuration.

In some embodiments, when a break interruption indicator is present for an interval otherwise eligible for meal break classification, the system generates an employer alert for timekeeping review and suppresses punitive scoring for the interval, thereby prompting correction or reclassification rather than penalizing an employee.

In some embodiments, to reduce privacy risk while still supporting accurate break classification, mobile client application 12 maintains break privacy mode during the break interval and performs on-device detection of a break interruption indicator that indicates whether a work-related interaction occurred during a break interval (for example, launching an allowlisted work application or responding to a work authentication prompt). In some embodiments, the break interruption indicator is transmitted as a binary or categorical signal without transmitting application identifiers, content, or contact names, and is used to prompt a timekeeping review or reclassification of a break interval rather than to penalize an employee.

In some embodiments, where a break interval is classified as a meal break type, the system generates an alert to employer portal UI 102 when a break interruption indicator is present, thereby enabling the employer to review whether the break should be treated as compensable time or otherwise corrected in the authoritative timekeeping system.

In some embodiments, payroll adjustments are transmitted using provider supported mechanisms, including API based submission, file based batch exports, secure file transfer, or other mechanisms. Integration adapters 166 translate a canonical payroll adjustment record to a provider specific representation, including mapping to the provider earning codes, time codes, and employee identifiers.

Exception Approvals and Scoring Adjustments

Figure 17:
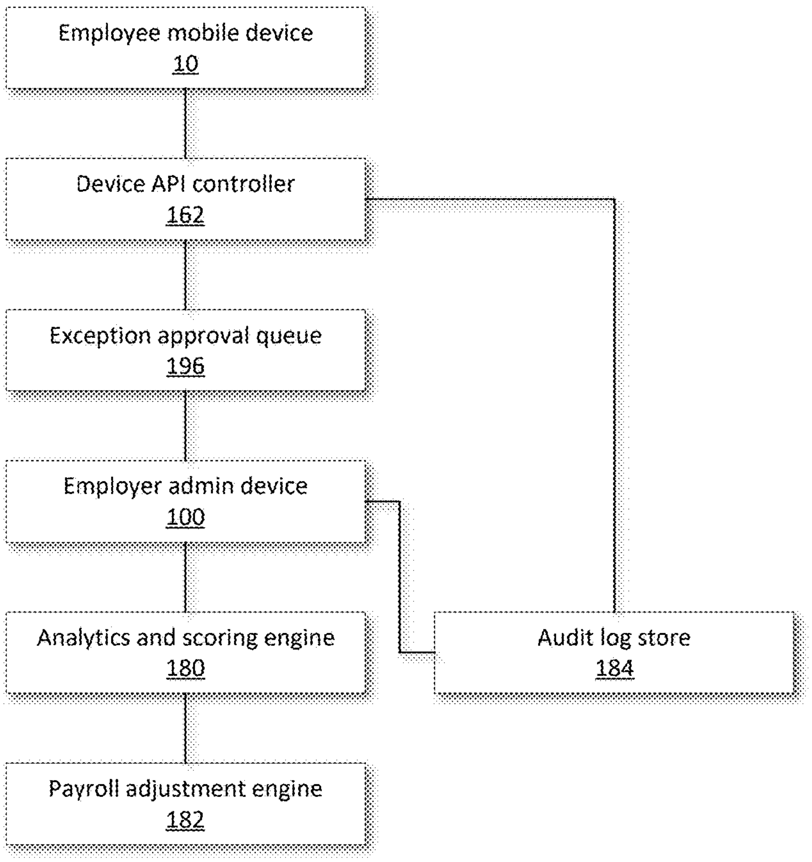
FIG. 17 is a flow diagram showing employee exception annotation and supervisor approval affecting compliance scoring and payroll outcomes.
Figure 18:
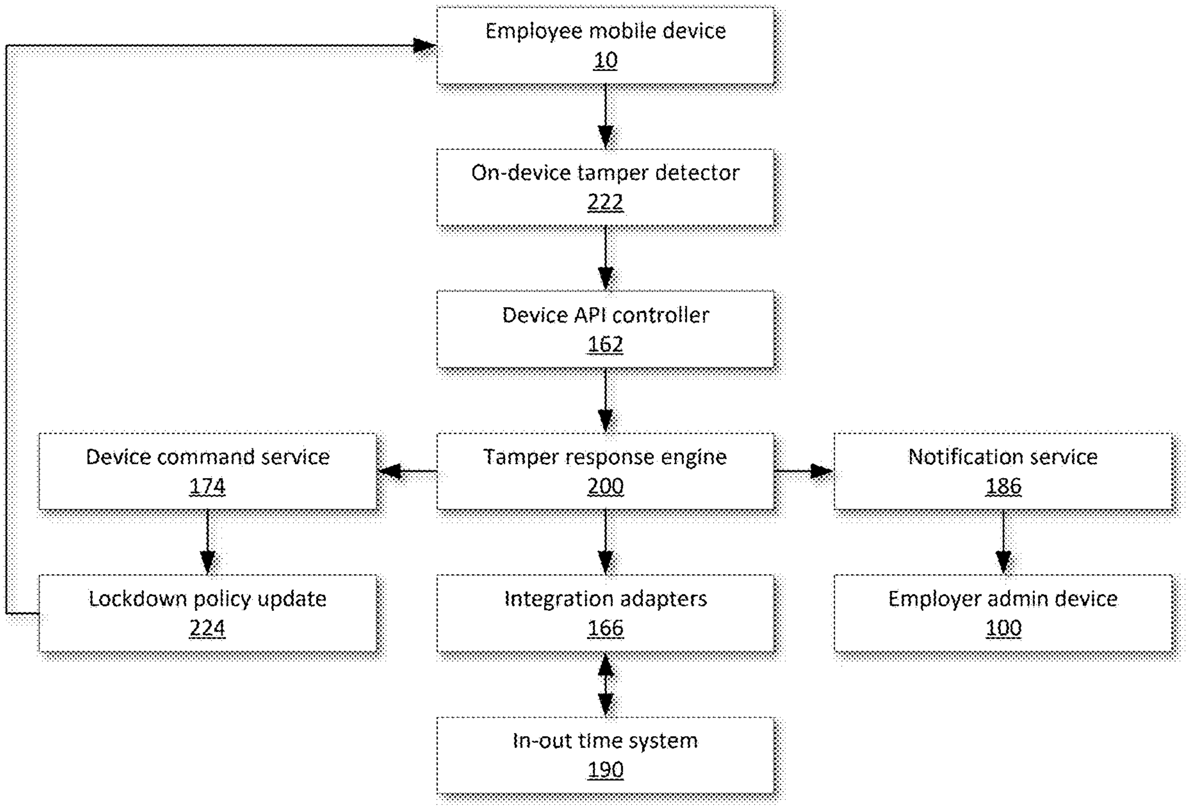
FIG. 18 is a flow diagram showing tamper detection and consequential actions including alerting and timekeeping or policy enforcement.

FIG. 17 illustrates an example flow showing employee exception annotation and supervisor approval affecting compliance scoring and payroll outcomes. In the illustrated embodiment, employee mobile device 10 submits an exception request via device API controller 162, and the request is stored in exception approval queue 196. Employer admin device 100 reviews the exception request. Analytics and scoring engine 180 recomputes compliance scoring based on approved exceptions. Payroll adjustment engine 182 generates or updates payroll adjustment records. Audit log store 184 stores audit records. These components are labeled in FIG. 17.

In some embodiments, employer admin device 100 retrieves pending exceptions via employer portal UI 102 and approves or denies them using approve selected button 128 or deny selected button 130 as shown in FIG. 10. Approved exceptions produce approved annotation records stored in audit log store 184 and or reporting and metrics store 206.

In some embodiments, analytics and scoring engine 180 recomputes compliance scores by excluding telemetry within approved exception intervals. In some embodiments, recomputation triggers payroll adjustment engine 182 to update or regenerate payroll adjustment records that correspond to the pay period, including updating a prior bonus amount or revising a punitive time classification adjustment.

In some embodiments, exception approvals can also trigger device policy changes, such as allowing a category for a defined duration or allowing a specific communication channel for a defined interval, and such changes can be applied by policy engine and compiler 172 and device command service 174.

In some embodiments, exception workflows also support dispute resolution where an employee challenges a compliance determination, and the employer can review audit data while still respecting telemetry privacy constraints. For example, the employer may view reason codes and durations without viewing application identities or message content.

Tamper Detection, Escalation, and Enforcement

FIG. 18 illustrates an example flow showing tamper detection and consequential actions. In the illustrated embodiment, employee mobile device 10 executes an on device tamper detector 222 configured to detect attempts to disable monitoring, revoke required permissions, uninstall the application, modify a managed profile, enter a rooted or jailbroken state, or otherwise interfere with telemetry integrity. Tamper detector 222 communicates a tamper event to device API controller 162. Tamper response engine 200 determines responses, including notifying the employer via notification service 186, issuing device commands via device command service 174, and recording the event in audit log store 184. A lockdown policy update 224 can be transmitted to employee mobile device 10, and employer admin device 100 can be notified. Integration adapters 166 can transmit information to in out time system 190. These components are labeled in FIG. 18.

In some embodiments, tamper response engine 200 can generate a compliance impact, such as reducing a compliance score, marking a shift as ineligible for rewards, or triggering a punitive policy escalation, subject to tenant configuration and legal constraints. In some embodiments, tamper handling contributes to auditability and payroll reliability by reducing incentives to disable monitoring in order to gain compensation benefits without complying with device engagement requirements.

Break Handling and Threshold Aggregation

Figure 19:
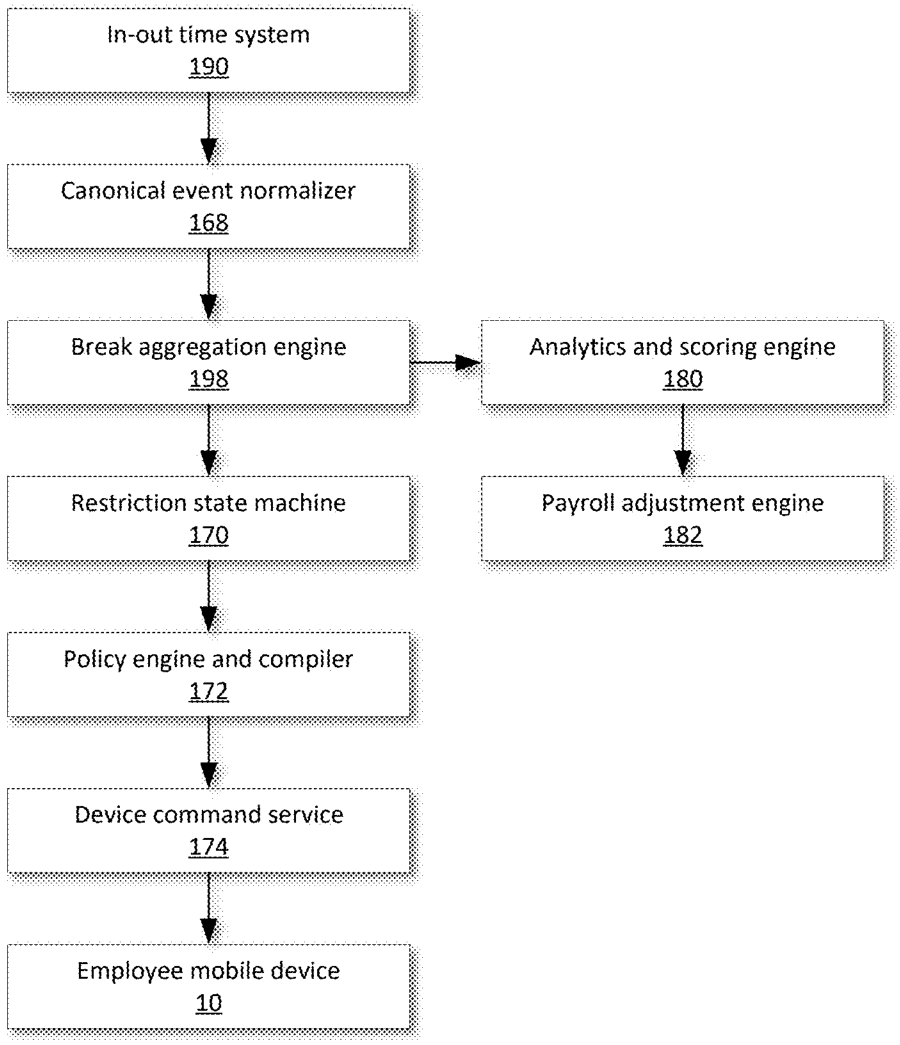
FIG. 19 is a flow diagram showing break handling and threshold aggregation integrated with restriction state transitions and scoring.

FIG. 19 illustrates an example flow showing break handling and threshold aggregation integrated with restriction state transitions and scoring. In the illustrated embodiment, canonical event normalizer 168 receives break events from in out time system 190 and provides them to break aggregation engine 198. Break aggregation engine 198 computes break allowances, detects when break thresholds are exceeded, and provides break interval information to restriction state machine 170 and to analytics and scoring engine 180. Restriction state machine 170 and policy engine and compiler 172 coordinate device policy and restrictions applied via device command service 174 to employee mobile device 10. Analytics and scoring engine 180 provides data to payroll adjustment engine 182. These components are labeled in FIG. 19.

In some embodiments, restriction state machine 170 transitions into a break state with relaxed restrictions during a break interval and then returns to a restricted on-shift state after the break interval ends. Policy engine and compiler 172 can adjust device policy accordingly. Break aggregation engine 198 provides computed break data to analytics and scoring engine 180 so that break intervals are excluded from compliance scoring or scored using different thresholds. In some embodiments, break-related events also influence payroll adjustment engine 182, for example, by generating paid or unpaid break classifications based on configured rules.

In some embodiments, break aggregation engine 198 and notification service 186 are configured to support compliance with tenant-configured break requirements by generating alerts when a break window is approaching or missed and by suppressing punitive scoring or payroll adjustments for intervals designated as break time under the authoritative timekeeping records or under an approved annotation record.

In some embodiments, break thresholds and budgets are configured per tenant and per employee role, stored in tenant configuration store 204, and versioned such that scoring can be reproduced for audit purposes.

Administrative Setup and Payroll Provider API Integration

FIG. 20 illustrates an example flow showing employer administrative setup of policy rules and payroll provider API integration credentials. In the illustrated embodiment, employer admin device 100 interacts with admin portal controller 164 to configure an employer tenant. Tenant configuration store 204 stores policy rule sets, incentive configurations, mapping rules between canonical payroll adjustments and provider specific fields, employee identifier mapping rules, and other settings. Key management service 202 secures sensitive configuration and manages keys used for encryption, signing, and authentication. OAuth token manager 214 obtains and refreshes access tokens used to access payroll provider system 188. Payroll provider system 188 is accessed via integration adapters 166, and backend platform 160 coordinates integration and enforces tenant isolation. Device command service 174 may also be configured, and device command service 174 communicates with employee mobile device 10. These components are labeled in FIG. 20.

In some embodiments, administrative setup further includes configuring one or more: (i) tracking disclosure templates and disclosure version identifiers, including whether employee signature or acknowledgment is required prior to activation, (ii) employee classification mapping rules including exemption-status indicators used by guardrails, (iii) protected absence codes and protected absence interval rules, and (iv) jurisdictional break thresholds and classification preferences. In some embodiments, employer portal UI 102 provides a disclosure management interface that enables versioning, re-consent triggers upon material configuration changes, and retrieval of stored tracking disclosure records for audit.

In some embodiments, administrative setup includes configuring whether payroll adjustments are submitted automatically or require employer approval, including configuration of pooled bonus distributions, thresholds, and reporting.

In some embodiments, administrative setup includes configuration of audit log retention and access policies, including which roles may access audit logs and what fields are visible.

Exemplary Payroll Provider Integrations and Adapter Behavior

The terms QuickBooks, ADP, and Paylocity are used herein solely as nonlimiting examples of third-party payroll provider systems and integration approaches. The disclosed integration adapter layer can be configured to integrate with any payroll or timekeeping provider that offers a programmatic interface, a file export mechanism, a secure file transfer mechanism, or another integration mechanism.

In some embodiments, integration adapters 166 include separate provider specific adapter modules, each responsible for authentication, field mapping, rate limiting, error handling, and submission semantics for a respective provider. By way of example and without limitation:

A QuickBooks adapter may interact with an Intuit QuickBooks payroll environment to create supplemental earnings items or adjustments, using provider supported authorization and submission methods.

An ADP adapter may interact with an ADP payroll environment to submit earnings, deductions, or time classifications, using provider supported authorization and submission methods.

A Paylocity adapter may interact with a Paylocity payroll environment to submit earnings adjustments and time classifications, using provider supported authorization and submission methods.

In some embodiments, each adapter uses OAuth token manager 214 for token acquisition and refresh where the provider supports OAuth style authorization. In some embodiments, the adapter uses key management service 202 to store client secrets, certificates, or API keys used for secure integration.

In some embodiments, an adapter implements a canonical payroll adjustment record interface, including fields such as employee identifier mapping, pay period identifier, adjustment type, compensation amount, time minutes, classification code, memo or description, and idempotency key. The adapter maps such fields to provider specific fields such as earning codes, deduction codes, time code identifiers, and employee identifiers.

Pseudo Code Examples for Authentication, Ingestion, Scoring, and Payroll Adjustments The following pseudo code is provided to illustrate implementation approaches. It is not intended to limit the claims, and endpoint names, field names, and provider requirements can vary by vendor and by deployment.

Pseudo Code Example 1: OAuth Style Authorization and Token Refresh for a Payroll Provider

```
function GetAccessToken(tenantId, providerName):
  creds = KeyManagementService.GetClientCredentials(tenantId,
providerName)
  token = OAuthTokenManager.GetCachedToken(tenantId,
providerName)
  if token is null or token.IsExpired( ):
    refreshToken = OAuthTokenManager.GetRefreshToken(tenantId,
providerName)
    response = Http.Post(
      url = ProviderConfig(providerName).TokenEndpoint,
      body = {
        "grant_type": "refresh_token",
        "client_id": creds.clientId,
        "client_secret": creds.clientSecret,
        "refresh_token": refreshToken
      }
    )
    token = ParseToken(response)
    OAuthTokenManager.StoreToken(tenantId, providerName, token)
    AuditLogStore.Append(tenantId, "TOKEN_REFRESH",
providerName, token.expiresAt)
 return token.accessToken
```

Pseudo Code Example 2: Receiving Timekeeping Events, Computing Idempotency Keys, and Normalizing to Canonical Events

```
function HandleTimekeepingWebhook(request):
  providerName = request.headers["X-Provider"]
  tenantId = ResolveTenant(request)
  VerifyWebhookSignature(request, tenantId, providerName)
  rawEvent = ParseJson(request.body)
  canonical = IntegrationAdapters.MapToCanonicalEvent(providerName,
rawEvent)
  idemKey = IdempotencyFilter.ComputeKey(
    tenantId = tenantId,
    employeeId = canonical.employeeId,
    eventType = canonical.type,
    eventTime = canonical.timestamp,
    sourceId = canonical.sourceEventId
  )
  if IdempotencyFilter.Exists(idemKey):
    AuditLogStore.Append(tenantId,
"DUPLICATE_EVENT_SUPPRESSED", idemKey, canonical.type)
    return Http.Ok( )
  IdempotencyFilter.Store(idemKey, ttlDays = 90)
  CanonicalEventNormalizer.StoreCanonicalEvent(tenantId, canonical,
idemKey)
  RestrictionStateMachine.ProcessCanonicalEvent(tenantId, canonical)
  return Http.Ok( )
```

Pseudo Code Example 3: Constructing Monitored Work Intervals from Canonical Clock in and Clock Out Records

```
function UpdateWorkIntervalFromEvent(tenantId, canonicalEvent):
  if canonicalEvent.type == "CLOCK_IN":
    WorkIntervalStore.OpenInterval(
      tenantId = tenantId,
      employeeId = canonicalEvent.employeeId,
      startTime = canonicalEvent.timestamp,
      source = canonicalEvent.source
    )
```

-continued

```
if canonicalEvent.type == "CLOCK_OUT":
    interval = WorkIntervalStore.GetOpenInterval(tenantId,
canonicalEvent.employeeId)
    if interval is not null:
      WorkIntervalStore.CloseInterval(interval.id, endTime =
canonicalEvent.timestamp)
    else:
      AuditLogStore.Append(tenantId,
"CLOCK_OUT_WITHOUT_OPEN_INTERVAL",
canonicalEvent.employeeId)
```

Pseudo Code Example 4: Telemetry Firewall Validation on the Device and on the Server

```
// On employee mobile device 10
function BuildTelemetryPayload(windowStart, windowEnd):
  raw = DeviceUsageCollector.Collect(windowStart, windowEnd)
  categorized = CategoryDictionaryMapping.MapToCategoryCodes(raw)
  payload = {
    "deviceId": DeviceIdentity.DeviceId( ),
    "windowStart": windowStart,
    "windowEnd": windowEnd,
    "categoryMetrics": categorized.metrics,
    "nonWorkIndicators": categorized.indicators
  }
  if TelemetryFirewall.ContainsProhibitedFields(payload):
    return null
  return payload
// On backend platform 160
function IngestTelemetry(tenantId, payload):
  if TelemetryFirewall.ContainsProhibitedFields(payload):
    AuditLogStore.Append(tenantId,
"TELEMETRY_REJECTED_SCHEMA", payload.deviceId)
    return Http.BadRequest( )
  TelemetryIngestionAPI.VerifyDeviceSignature(payload)
  Reporting MetricsStore.Write(tenantId, payload)
  AuditLogStore.Append(tenantId, "TELEMETRY_ACCEPTED",
payload.deviceId, payload.windowStart)
  return Http.Ok( )
```

Pseudo Code Example 5: Compliance Scoring with Category Budgets, Breaks, and Approved Exceptions

```
function ComputeComplianceScore(tenantId, employeeId, intervalId):
  interval = WorkIntervalStore.GetInterval(intervalId)
  policy = TenantConfigStore.GetPolicyRuleSet(tenantId, employeeId,
interval.startTime)
  telemetry = ReportingMetricsStore.QueryTelemetry(employeeId,
interval.startTime, interval.endTime)
  breaks = BreakEngine.GetBreakIntervals(tenantId, employeeId,
interval.startTime, interval.endTime)
  exceptions = ExceptionStore.GetApprovedExceptionIntervals(tenantId,
employeeId, interval.startTime, interval.endTime)
  scoredTelemetry = ExcludeIntervals(telemetry, breaks + exceptions)
  nonWorkMinutes = SumCategoryMinutes(scoredTelemetry,
policy.nonWorkCategories)
  violations = CountIndicators(scoredTelemetry, "NON_WORK_EVENT")
  score = 100.0
  score = score - policy.minutesPenaltyFactor * Max(0, nonWorkMinutes
- policy.allowedNonWorkMinutes)
  score = score - policy.violationPenaltyFactor * violations
  score = Clamp(score, 0, 100)
  return score
```

Pseudo Code Example 6: Reward Mode Bonus Computation and Creation of a Payroll Adjustment Record

```
function BuildRewardAdjustment(tenantId, employeeId, payPeriodId,
score):
  cfg = TenantConfigStore.GetIncentiveConfig(tenantId,
"REWARD_MODE")
  if score < cfg.rewardThreshold:
    return null
  amount = cfg.baseBonusAmount
  if cfg.useProportionalBonus:
    amount = amount * (score / 100.0)
  return {
    "tenantId": tenantId,
    "employeeId": employeeId,
    "payPeriodId": payPeriodId,
    "type": "COMPENSATION_ADJUSTMENT",
    "direction": "ADD",
    "amount": RoundToCents(amount),
    "memo": "Compliance reward bonus",
    "idempotencyKey": Hash(tenantId + employeeId + payPeriodId +
"BONUS" + amount)
  }
```

Pseudo Code Example 7: Punitive Mode Time Classification Adjustment and Deduction Computation

```
function BuildPunitiveAdjustments(tenantId, employeeId, intervalId,
score):
  cfg = TenantConfigStore.GetIncentiveConfig(tenantId,
"COMPLIANCE_MODE")
  if score >= cfg.complianceThreshold:
    return [ ]
  interval = WorkIntervalStore.GetInterval(intervalId)
  unpaidMinutes = ComputeUnpaidMinutes(interval, score, cfg)
  adjustments = [ ]
  adjustments.Add({
    "tenantId": tenantId,
    "employeeId": employeeId,
    "payPeriodId": interval.payPeriodId,
    "type": "TIME_CLASSIFICATION_ADJUSTMENT",
    "classification": "UNPAID",
    "minutes": unpaidMinutes,
    "memo": "Non work engagement over threshold",
    "idempotencyKey": Hash(tenantId + employeeId +
interval.payPeriodId + "UNPAID" + unpaidMinutes)
  })
  if cfg.alsoApplyDeduction:
    deductionAmount = ComputeDeductionAmount
(unpaidMinutes, cfg.rate)
    adjustments.Add({
      "tenantId": tenantId,
      "employeeId": employeeId,
      "payPeriodId": interval.payPeriodId,
      "type": "COMPENSATION_ADJUSTMENT",
      "direction": "SUBTRACT",
      "amount": RoundToCents(deductionAmount),
      "memo": "Compliance deduction",
      "idempotencyKey": Hash(tenantId + employeeId +
interval.payPeriodId + "DEDUCT" + deductionAmount)
    })
  return adjustments
```

Pseudo Code Example 8: Batch Submission to a Provider with Safe Retry and Status Reconciliation

```
function SubmitPayrollBatch(tenantId, providerName, payPeriodId):
   token = GetAccessToken(tenantId, providerName)
   batch = PayrollBatchSubmission.BuildBatch(tenantId, payPeriodId)
   if PayrollBatchSubmission.AlreadySubmitted(batch.batchId):
      return
   response = IntegrationAdapters.SubmitBatch(providerName, token,
batch)
   if response.success:
      PayrollBatchSubmission.MarkSubmitted(batch.batchId,
response.providerBatchId)
      AuditLogStore.Append(tenantId,
"PAYROLL_BATCH_SUBMITTED", batch.batchId,
response.providerBatchId)
   else:
      AuditLogStore.Append(tenantId,   "PAYROLL_BATCH_ERROR",
batch.batchId, response.errorCode)
      RetryQueue.Enqueue(batch.batchId, backoff = "EXPONENTIAL")
```

Pseudo Code Example 9: Pooled Bonus Allocation, Ranking, and Payroll Adjustment Record Generation

```
function AllocateBonusPool(tenantId, payPeriodId):
   cfg = TenantConfigStore.GetPoolConfig(tenantId, payPeriodId)
   scores  =  AnalyticsScoring Engine.GetScoresForPeriod(tenantId,
payPeriodId)
   ranked = SortDescending(scores, by = "score")
   winners = TakeTopPercent(ranked, cfg.topPercent)
   allocations  =  Allocation Model.Apply(cfg.model,   winners,
cfg.poolAmount)
   records = [ ]
   for each alloc in allocations:
      records.Add({
         "tenantId": tenantId,
         "employeeId": alloc.employeeId,
         "payPeriodId": payPeriodId,
         "type": "COMPENSATION_ADJUSTMENT".
         "direction": "ADD",
         "amount": alloc.amount,
         "memo": "Pooled compliance bonus",
         "idempotencyKey":  Hash(tenantId  +  alloc.employeeId  +
payPeriodId + "POOL" + alloc.amount)
      })
   return records
```

Immediate Employer Bonusing with Batched Payroll Submission and Immediate Employee Notice In some embodiments, the system includes an immediate recognition mode in which an employee receives near real-time notice of a forthcoming bonus during a pay period, while monetary transfer remains executed through payroll provider system 188 at a next payroll submission. This mode can increase motivational impact without requiring off-cycle payroll processing.

In some embodiments, analytics and scoring engine 180 computes an interim compliance score during an open monitored work interval, such as periodically every five minutes, at defined milestones, or when a threshold event occurs. When an interim score meets or exceeds a tenant configured performance threshold that exceeds a baseline compliance threshold, payroll adjustment engine 182 generates a pending bonus record, which is distinct from a finalized payroll adjustment record. The pending bonus record can include employee identifier, pay period identifier, amount, a reason code, and a pending state.

In some embodiments, notification service 186 transmits an immediate notice to employee mobile device 10 to be displayed by mobile client application 12, indicating that an additional bonus amount has been earned and is scheduled to be included in the next payroll batch. In some embodiments, employer portal UI 102 also displays the pending bonus in a supervisor view, allowing optional confirmation, cancellation, or annotation.

At payroll batch time, payroll adjustment engine 182 converts pending bonus records to payroll adjustment records and includes them in payroll batch submission 208, ensuring idempotency using a stable idempotency key tied to the pending bonus record identifier. Audit log store 184 stores a linkage between the pending bonus record, the resulting payroll adjustment record, and the provider acknowledgment from payroll provider system 188.

This immediate recognition mode can be combined with reward mode and pooled incentive models. For example, a shift exceeding expectations may earn an immediate notice of a micro bonus while the employee remains eligible for a pooled distribution at the end of the month.

Additional Embodiments Enabled by Payroll and Device Integration

The disclosed payroll and mobile device integration enables additional embodiments beyond the basic incentive and adjustment models, including embodiments that improve data reliability, reduce fraud, enhance privacy, and improve employee experience, while remaining compatible with authoritative payroll records.

Privacy Preserving Proximity Assisted Shift Initiation and Prompts

In some embodiments, employee mobile device 10 includes a proximity assisted shift initiation feature that improves alignment between device based controlled work intervals and authoritative timekeeping events. In this embodiment, the mobile client application 12 detects that the device is within a configured proximity condition associated with a workplace, such as proximity to a low energy beacon, proximity to an employer managed Wi Fi network identifier, or entry into a geofence computed on device. The mobile client application 12 can then prompt the employee to clock in, or to confirm that a clock in has occurred.

In some embodiments, the system is privacy preserving in that employee mobile device 10 does not transmit raw location coordinates to backend platform 160. Instead, the device transmits a minimal proximity indicator such as within zone true or false and a time stamp, optionally cryptographically signed. Backend platform 160 can use this proximity indicator as a corroborating signal to: (i) begin telemetry collection windowing, (ii) prefetch expected schedules from payroll provider system 188, (iii) alert the employee to complete clock in if no clock in record is received within a configured tolerance window, or (iv) reconcile suspicious discrepancies between expected work intervals and timekeeping events.

Privacy-Preserving Off-Shift Work Detection and Time-Reporting Prompt

In some embodiments, mobile client application 12 performs on-device detection of potential off-shift work without transmitting application identifiers, content, or location coordinates. When the employee is not within a monitored work interval and a limited set of work-related signals is detected, the mobile client application 12 presents a time-reporting prompt that requests an employee indication of whether compensable work is being performed. Work-related signals can include, without limitation: launching an employer-managed work application, responding to an employer multi-factor authentication prompt, or engaging an allowlisted supervisor communication channel.

In some embodiments, the time-reporting prompt provides selectable actions including: (i) initiate a clock-in action through an employer timekeeping interface, (ii) submit a time correction request for review, or (iii) indicate that the activity was non-work. In some embodiments, upon employee selection to submit, the mobile client application 12 transmits a potential off-shift work indicator to backend platform 160 as a binary or categorical signal with a timestamp and without application identity or content. Backend platform 160 can use the indicator to open a time record verification workflow and or to generate a time correction suggestion record for employer review, while suppressing punitive payroll adjustments based on such indicators.

In some embodiments, the proximity indicator is treated as corroborating only and is not treated as conclusive that work has ended, because employees may perform work away from a preapproved work location. Accordingly, the proximity indicator is used to trigger prompts, discrepancy flags, and timekeeping review workflows rather than to automatically reduce recorded hours worked or to finalize a payroll-impacting clock-out time.

In some embodiments, this proximity assisted prompting is used for fraud reduction without relying on invasive tracking, and can be configured by tenant configuration store 204 for specific roles, sites, or job functions.

Driving Safety Mode and Insurance Opt-In Programs

In some embodiments, the system determines that an employee is driving during a portion of a monitored work interval using a driving-state indicator computed on employee mobile device 10, for example using GPS-derived speed, accelerometer data, gyroscope data, connection to a vehicle Bluetooth system, or a combination. When the driving-state indicator indicates driving and the employee is clocked in, restriction state machine 170 transitions employee mobile device 10 into a driving restriction state and policy engine and compiler 172 applies a driving safety policy that is more restrictive than a non-driving work policy. The driving safety policy can, for example, enforce a zero non-work category budget, limit interactions to navigation and employer dispatch applications, block texting and social applications, and permit emergency services calling to emergency services numbers such as 911.

In some embodiments, a driver can voluntarily enroll in an insurance program that uses the driving safety policy and compliance verification mechanisms. In this insurance program, the driver indicates consent to apply the driving safety policy for each detected driving interval, including outside of employer work time, and backend platform 160 generates insurance compliance records that represent, for example, a percentage of driving intervals completed without prohibited interactions. The insurance compliance records can be transmitted to an insurance provider system using an integration adapter, and the insurance provider system determines any premium discount, rebate, or other benefit based on the received insurance compliance records.

Shadow Scoring and Calibration Mode

In some embodiments, backend platform 160 provides a shadow scoring mode in which device engagement telemetry is collected and compliance scores are computed, but payroll adjustment records are not transmitted to payroll provider system 188. Shadow scoring can be used during pilot deployments to calibrate thresholds, category budgets, and break rules, and to validate vendor event ingestion and normalization without affecting payroll. In some embodiments, shadow scoring produces audit records in audit log store 184 and limited summaries for employer portal UI 102, while preserving employee consent requirements.

Provider Reconciliation and Multi Source Verification

In some embodiments, integration adapters 166 ingest timekeeping events from multiple sources, such as a timekeeping vendor stream and a payroll vendor stream, and canonical event normalizer 168 reconciles the sources using an authority hierarchy stored in tenant configuration store 204. For example, a timekeeping system may be authoritative for break start and break end events, while the payroll provider is authoritative for paid time classifications. Backend platform 160 can identify discrepancies, record them in audit log store 184, and optionally prevent submission of payroll adjustments until discrepancies are resolved by an authorized user.

Adaptive Policy Compilation Based on Role and Compliance History

In some embodiments, policy engine and compiler 172 compiles policies that adapt based on employee role, schedule, and compliance history, while still relying on privacy preserving telemetry. For example, employees with consistent compliance may receive less restrictive device behavior while still generating telemetry sufficient for scoring, whereas repeated non compliance can trigger more restrictive category budgets or more frequent compliance prompts, subject to tenant configuration and applicable rules.

Auditability and Dispute Handling without Intrusive Telemetry

In some embodiments, audit log store 184 stores proofs and summaries rather than raw detailed activity. For example, the audit record can store a hash of telemetry payloads, policy version identifiers, and computed scores, enabling later verification that a score was computed from particular inputs without storing identifying app data. In some embodiments, employee disputes initiated through report issue button 94 trigger a workflow in which the employer can review reason codes, time windows, and score components without viewing app identities, message content, or location coordinates.

Exemplary Provider Specific Mapping Patterns for QuickBooks, ADP, and Paylocity

In some embodiments, integration adapters 166 implement provider specific mapping patterns. For example:

For Intuit QuickBooks, a payroll adjustment record representing a bonus may be mapped to a supplemental earnings entry or other provider supported earnings construct. A time classification adjustment may be mapped to an adjustment of tracked time categories where supported by the provider environment.

For ADP, a payroll adjustment record may be mapped to an earnings code entry, a deduction code entry, or a time category adjustment according to ADP supported submission mechanisms.

For Paylocity, a payroll adjustment record may be mapped to a supplemental earning or time code adjustment entry according to Paylocity supported submission mechanisms.

In each case, the adapter uses tenant configuration store 204 to map canonical adjustment types to provider specific codes and employee identifiers, and uses OAuth token manager 214 and key management service 202 to manage authentication materials. The brand names are referenced only as exemplary examples to show approaches to integration and are not limiting.

The foregoing embodiments are illustrative and not restrictive. Variations may be made without departing from the scope of the claims.

Glossary of Claim Terms

Allowlist means a set of permitted identifiers, such as permitted application identifiers and/or permitted phone numbers, that are allowed during a restricted interval while other identifiers are blocked, deferred, or restricted.

Approved annotation record means a data record indicating an exception interval that has been accepted for compliance evaluation purposes, where the record identifies at least an employee, a time interval, and an approval state. The record may be generated from an employee-submitted annotation and updated based on employer approval, and may be used by the server system to exclude or reclassify telemetry occurring during the associated interval.

Bonus pool amount means a predefined quantity of compensation value designated for distribution among multiple employees for a defined incentive period. The bonus pool amount may be allocated using an allocation model such as ranking-based selection, tiered awards, proportional awards, or equal shares, and may be distributed by generating payroll adjustment records for a subset of employees.

Break interval means a time interval identified as a break period for an employee, where the break interval is designated by a timekeeping record, a break event, a break control action, or a combination. A break interval may be excluded from compliance scoring, scored using different thresholds, or used to trigger device policy changes, depending on tenant configuration and applicable rules.

Break interruption indicator means a binary or categorical signal indicating that a work-related interaction occurred during a break interval, where the signal is derived on-device and transmitted without application identifiers, content, contact names, or location coordinates.

Break privacy mode means a device state during a break interval in which device engagement telemetry collection and transmission of category-level usage metrics and non-work interaction event indicators are suspended, and only break markers and or approved break-type codes are transmitted.

Canonical event record means a normalized representation of a timekeeping event, expressed in a standard schema used by the server system independent of any particular payroll or timekeeping vendor format. A canonical event record may represent events such as clock-in, clock-out, break start, break end, or corrections, and may include fields sufficient to determine monitored work intervals and state transitions.

Cash-neutral incentive configuration means a tenant configuration in which an incentive pool amount is funded at least in part from amounts associated with unpaid time classifications and/or deductions assessed for non-compliance.

Category dictionary means a data structure that maps application identifiers, process identifiers, or other device activity identifiers to category codes. The mapping may be executed on a mobile device so that telemetry is represented using category codes instead of application identifiers, thereby enabling category-level scoring while reducing exposure of sensitive or identifying information.

Category-level usage metric means a quantified measurement of device activity expressed at a category level, rather than at an application-identity level. A category-level usage metric can include duration, count of interactions, frequency, or other measurements associated with one or more category codes and may be used to compute compliance scores without transmitting application identifiers.

Clock-in record means a timekeeping record indicating a start of a work interval, the record including at least an employee identifier and a clock-in timestamp. A clock-in record can be received from an external payroll provider system or timekeeping system, and can be normalized into a canonical event record for determining monitored work intervals and initiating policy actions.

Clock-out record means a timekeeping record indicating an end of a work interval, the record including at least an employee identifier and a clock-out timestamp. A clock-out record can be received from an external payroll provider system or timekeeping system, and can be normalized into a canonical event record for determining monitored work intervals and terminating policy actions.

Compliance score means a computed value derived from device engagement telemetry and a policy rule set, where the value indicates a level of compliance with one or more device engagement requirements during a monitored work interval or portion thereof. The compliance score may be computed as a percentage, a point value, a classification, or another measure, and may be used to generate payroll adjustment records.

Device engagement telemetry means data received from a mobile device that is suitable for determining device engagement relative to work requirements during a monitored work interval. Device engagement telemetry can include category-level usage metrics, non-work interaction event indicators, or both, and may be filtered by privacy controls such as a telemetry firewall and category dictionary mapping.

Driving interval means a time interval within a monitored work interval during which a driving-state indicator indicates that an employee is operating a vehicle.

Driving-state indicator means a data value computed on a user device that indicates whether the user device is in a driving condition, for example based on GPS-derived speed, motion sensors, or a vehicle connection, without requiring transmission of raw location coordinates.

Enrollment indicator means a data value indicating whether an employee is enrolled in an incentive program for a payroll period, incentive period, or other interval. The enrollment indicator may control whether payroll adjustment records are generated, whether reward-mode incentives are permitted, whether punitive-mode adjustments are permitted, or a combination, and can reflect voluntary enrollment in embodiments.

Employee classification rule means a tenant-configured rule set that associates an employee with one or more wage-and-hour relevant classifications, including whether the employee is treated as nonexempt or exempt for guardrail evaluation, and optionally including wage-floor parameters, salary-basis parameters, and prohibited adjustment types.

External payroll provider system means a computing system operated by a payroll or timekeeping provider that stores or processes authoritative payroll data and or timekeeping records for employees. An external payroll provider system can provide clock-in and clock-out records to the server system and can receive payroll adjustment records from the server system to update payroll data.

First responder number means an emergency services telephone number designated as always permitted for calling during restricted intervals, including during a driving interval, for example 911.

Idempotency key means a value associated with an event or submission that enables detection of duplicate processing of substantially the same event or submission. An idempotency key may be derived from one or more fields such as employee identifier, event type, timestamp, and source identifier, and may be stored so that repeated events with the same key do not cause repeated state transitions or duplicate payroll submissions.

Integration adapter layer means a collection of one or more adapters configured to interface between the server system and one or more external provider systems, where the adapters perform provider-specific authentication, field mapping, normalization, and submission. The integration adapter layer can support multiple vendors by translating between vendor-specific formats and canonical formats used internally by the server system.

Monitored work interval means a time interval determined by a server system based on timekeeping records, including at least a clock-in timestamp and a clock-out timestamp, and associated with an employee for purposes of compliance scoring and payroll adjustment generation. A monitored work interval may be adjusted based on corrections, break intervals, and approved exception intervals.

Protected absence interval means a time interval identified by timekeeping codes, leave classifications, or other authorized indicators as protected or otherwise authorized time away from work, where the interval is excluded from adverse compliance scoring and excluded from punitive adjustment eligibility.

Provisional closure state means a non-final interval state used to close an otherwise open monitored work interval for restriction state management and telemetry windowing when an authoritative clock-out record is missing or delayed, where payroll-impacting determinations dependent on the provisional closure are suppressed pending verification.

Non-work interaction event indicator means a signal, flag, or record indicating that an interaction occurred that is designated as non-work under a policy rule set. The indicator may be generated on a mobile device or by a server system from telemetry and may be used for scoring and payroll adjustment generation without revealing an application identifier or content of a communication.

Overtime inclusion indicator means a data value associated with a payroll adjustment record that indicates whether the adjustment is to be treated as a nondiscretionary bonus for overtime regular-rate calculations for nonexempt employees, and optionally indicates a workweek allocation rule. Paid-time classification adjustment means a payroll-relevant modification that changes how a portion of time is classified for compensation purposes, such as designating a portion of time as unpaid time, paid time, break time, or another payroll provider recognized category. A paid-time classification adjustment can be included in a payroll adjustment record and transmitted to an external payroll provider system.

Payroll adjustment record means a data record generated by a server system that specifies an adjustment to payroll data for an employee, where the adjustment includes at least one of a compensation adjustment or a paid-time classification adjustment. A payroll adjustment record can be transmitted to an external payroll provider system to cause an automated update of payroll data associated with the employee.

Policy rule set means a set of configurable rules used to evaluate device engagement telemetry and determine compliance scoring and payroll outcomes. A policy rule set can include category budgets, thresholds, break handling rules, exception handling rules, enrollment requirements, reward formulas, punitive formulas, pooled distribution rules, and other criteria used by the server system.

Telemetry firewall means a software component executed on a mobile device that enforces constraints on telemetry collection and or telemetry transmission by blocking prohibited data fields and enforcing an allowed telemetry schema. A telemetry firewall may prevent transmission of application identifiers, message content, contact names, web content, or location coordinates while allowing transmission of category-level metrics or event indicators needed for compliance scoring.

Time record attestation record means a data record indicating that an employee reviewed a presented summary of timekeeping records for a time window and either affirmed that the presented records reflect all hours worked or submitted a correction request, the record including at least an employee identifier, a time window identifier, and an attestation state.

Tracking disclosure record means a data record indicating that an employee acknowledged a tracking disclosure that describes at least categories of data collected, temporal scope, access scope, and payroll adjustment rules, the record including at least a disclosure version identifier and an acknowledgment indicator.

In the aforementioned detailed description of the present invention, reference is made to the accompanying drawings, which form a part thereof, and within which are shown by way of illustration specific embodiments by which the invention may be practiced. Numerous specific details are set forth to provide a thorough description of the embodiments of the present invention. It will be apparent to one of ordinary skill in the art that some embodiments may be practiced without some of these specific details. It is to be understood that other embodiments may be utilized, and structural changes may be made without departing from the scope of the invention.

Table of Figure Reference Numerals

| Ref. No. | Description | Ref. No. | Description |
|---|---|---|---|
| 10 | Employee mobile device | 12 | Mobile client application |
| 14 | Employee email or phone field | 16 | Employee ID field |
| 18 | Additional identifier field | 20 | Continue button |
| 22 | Scan employer QR button | 24 | QR code image |
| 26 | Camera access toggle | 28 | Setup code field |
| 30 | Continue to verification button | 32 | Verification method selector |
| 34 | SMS authenticator option | 36 | Verification code input |
| 38 | Verify and finish button | 40 | Payroll connection indicator |
| 42 | Reward mode toggle | 44 | Compliance mode selector |
| 46 | Incentive preview panel | 48 | Payroll adjustment consent checkbox |

-continued

| Table of Figure Reference Numerals | | | |
|---|---|---|---|
| Ref. No. | Description | Ref. No. | Description |
| 50 | Accept and continue button | 52 | Shift status indicator |
| 54 | Compliance score display | 56 | Bonus estimate display |
| 58 | View payroll adjustments button | 60 | Annotate exception button |
| 62 | Privacy notice text | 64 | Privacy info icon |
| 66 | Controlled work interval panel | 68 | Break allowance indicator |
| 70 | Category budget indicator | 72 | Start break button |
| 74 | Emergency call button | 76 | Exception duration control |
| 78 | Exception note field | 80 | Submit exception button |
| 82 | Supervisor approval toggle | 84 | Reason code selector |
| 86 | Pay period selector | 88 | Adjustment items list |
| 90 | Bonus adjustment item | 92 | Export statement button |
| 94 | Report issue button | 96 | Exception time adjustment item |
| 98 | Non-work budget adjustment item | 100 | Employer admin device |
| 102 | Employer portal UI | 104 | Filters panel |
| 106 | Compliance summary widget | 108 | Bonus pool status widget |
| 112 | Employee list table | 114 | Alerts panel |
| 116 | View employee detail button | 118 | Export report button |
| 120 | Employee header panel | 122 | Compliance summary panel |
| 124 | Compliance chart widget | 126 | Exception log table |
| 128 | Approve selected button | 130 | Deny selected button |
| 132 | Supervisor actions panel | 134 | Send message button |
| 136 | Send HR button | 138 | Lockdown button |
| 140 | Pay period selector | 142 | Bonus pool amount field |
| 144 | Allocation model selector | 146 | Incentive distribution table |
| 148 | Payroll export preview panel | 150 | Preview adjustments button |
| 152 | Submit to payroll button | 154 | Submission status panel |
| 156 | Audit log control | 160 | CIPHO backend platform |
| 162 | Device API controller | 164 | Admin portal controller |
| 166 | Integration adapters | 168 | Canonical event normalizer |
| 170 | Restriction state machine | 172 | Policy engine and compiler |
| 174 | Device command service | 176 | On-device telemetry firewall |
| 178 | Telemetry ingestion API | 180 | Analytics and scoring engine |
| 182 | Payroll adjustment engine | 184 | Audit log store |
| 186 | Notification service | 188 | Payroll provider system |
| 190 | In-out time system | 192 | Enrollment and QR service |
| 194 | MFA verification service | 196 | Exception approval queue |
| 198 | Break aggregation engine | 200 | Tamper response engine |
| 202 | Key management service | 204 | Tenant configuration store |
| 206 | Reporting and metrics store | 208 | Payroll batch submission |
| 210 | Webhook listener | 212 | Idempotency filter |
| 214 | OAuth token manager | 216 | Category dictionary mapping |
| 222 | On-device tamper detector | 224 | Lockdown policy update |

The phrases "in some embodiments," "according to some embodiments," "in the embodiments shown," "in other embodiments," and the like generally mean the particular feature, structure, or characteristic following the phrase is included in at least one implementation. In addition, such phrases do not necessarily refer to the same embodiments or different embodiments.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A computer-implemented method comprising:

a. receiving, by a server system from an external payroll provider system, a clock-in record for an employee, the clock-in record including an employee identifier and a clock-in timestamp;

b. receiving, by the server system from the external payroll provider system, a clock-out record for the employee, the clock-out record including the employee identifier and a clock-out timestamp;

c. determining, by the server system, a monitored work interval for the employee based on the clock-in timestamp and the clock-out timestamp;

d. receiving, by the server system from a mobile device associated with the employee, device engagement telemetry corresponding to the monitored work interval, the device engagement telemetry including (A) at least one of (i) a category-level usage metric or (ii) a non-work interaction event indicator and (B) an enrollment indicator that identifies the employee as voluntarily enrolled in an incentive program for a payroll period;

e. computing, by the server system, a compliance score for the employee for at least a portion of the monitored work interval using the device engagement telemetry and a policy rule set;

f. generating, by the server system, a payroll adjustment record for the employee based on the compliance score, the payroll adjustment record specifying at least one of (i) a compensation adjustment or (ii) a paid-time classification adjustment, wherein generating the payroll adjustment record is performed only when the enrollment indicator indicates voluntary enrollment; and g. transmitting, by the server system to the external payroll provider system, the payroll adjustment record to cause an automated update of payroll data associated with the employee; and wherein receiving the clock-in record and the clock-out record comprises normalizing vendor-specific timekeeping events into canonical event records using idempotency keys to suppress duplicate processing before determining the monitored work interval.

2. The method of claim 1, wherein the payroll adjustment record specifies a positive compensation adjustment corresponding to a bonus and excludes negative compensation adjustments.

3. The method of claim 1, wherein the payroll adjustment record specifies at least one of (i) a negative compensation adjustment or (ii) a paid-time classification adjustment that designates a portion of the monitored work interval as unpaid time.

4. The method of claim 1, further comprising determining, by the server system, a plurality of compliance scores for a plurality of employees for a defined incentive period, ranking the plurality of employees based on the plurality of compliance scores, allocating a bonus pool amount across at least a subset of the ranked employees, and generating a respective payroll adjustment record for each employee in the subset to distribute the allocated bonus pool amount through the external payroll provider system.

5. The method of claim 1, further comprising excluding, from the compliance score, device engagement telemetry that occurs during at least one of (i) a break interval identified by a break record received from the external payroll provider system or (ii) an approved exception interval indicated by an approved annotation record.

6. The method of claim 1, wherein receiving device engagement telemetry comprises receiving telemetry that is filtered by a telemetry firewall that blocks prohibited data fields including at least one of an application identifier, message content, contact name, or location coordinate.

7. A system comprising: a server system including an integration adapter layer comprising a plurality of vendor adapters, each vendor adapter configured to authenticate to a respective external payroll provider system, ingest vendor-specific timekeeping events, and transmit payroll adjustment records to the respective external payroll provider system, the server system further including one or more processors and memory storing instructions that, when executed, cause the server system to:

a. receive, through a vendor adapter of the integration adapter layer authenticated to the external payroll provider system, from an external payroll provider system, a timekeeping event stream including vendor-specific timekeeping events corresponding to at least a clock-in record and a clock-out record for an employee;

b. determine a monitored work interval for the employee based on the clock-in record and the clock-out record after normalizing the vendor-specific timekeeping events into canonical event records and applying idempotent processing by storing an idempotency key for each canonical event record and suppressing duplicate processing for repeated idempotency keys;

c. receive, from a mobile device associated with the employee, device engagement telemetry corresponding to the monitored work interval;

d. compute a compliance score from the device engagement telemetry using a policy rule set;

e. generate a payroll adjustment record based on the compliance score, the payroll adjustment record specifying at least one of (i) a compensation adjustment or (ii) a paid-time classification adjustment; and f. transmit the payroll adjustment record to the external payroll provider system to cause an automated update of payroll data for the employee; and g. the mobile device including one or more processors and memory storing a client application that includes a category dictionary that maps application identifiers to category codes on the mobile device and that, when executed, causes the mobile device to generate the device engagement telemetry using the category codes while withholding the application identifiers from the device engagement telemetry for the monitored work interval and transmit the device engagement telemetry to the server system.

8. The system of claim 7, wherein the client application includes a telemetry firewall that enforces a telemetry schema by rejecting outbound payloads that contain prohibited data fields including at least one of message content, contact names, web browsing content, or location coordinates.

9. The system of claim 7, wherein the server system is configured to receive a user annotation record from the client application, determine an approval decision for the user annotation record, and compute the compliance score by excluding, from the device engagement telemetry, telemetry occurring during an approved exception interval associated with the user annotation record.

10. The system of claim 7, wherein the server system is configured to implement an incentive period having a defined bonus pool amount, compute compliance scores for a plurality of employees, rank the plurality of employees, allocate portions of the bonus pool amount to at least a subset of the plurality of employees, and generate and transmit corresponding payroll adjustment records to distribute the portions through the external payroll provider system.

11. A non-transitory computer-readable medium storing instructions that, when executed by one or more processors of a server system and one or more processors of a mobile device, cause operations comprising:

a. ingesting, by the server system from an external payroll provider system, timekeeping records for an employee that include at least a clock-in record and a clock-out record, wherein ingesting the timekeeping records comprises normalizing vendor-specific events into canonical event records and applying idempotent processing using idempotency keys before determining the monitored work interval; determining, by the server system, a monitored work interval based on the clock-in record and the clock-out record;

b. receiving, by the server system from the mobile device, device engagement telemetry corresponding to the monitored work interval;

c. computing, by the server system, a compliance score using the device engagement telemetry and a policy rule set;

d. generating, by the server system, a payroll adjustment record based on the compliance score, the payroll adjustment record specifying at least one of (i) a compensation adjustment or (ii) a paid-time classification adjustment; and e. transmitting, by the server system to the external payroll provider system, the payroll adjustment record to cause an automated update of payroll data for the employee.

12. The non-transitory computer-readable medium of claim 11, wherein the operations further comprise receiving an enrollment indicator that indicates whether the employee is voluntarily enrolled in an incentive program, and generating the payroll adjustment record only when the enrollment indicator indicates voluntary enrollment.

13. The non-transitory computer-readable medium of claim 12, wherein generating the payroll adjustment record comprises generating a positive compensation adjustment responsive to the compliance score meeting a reward threshold.

14. The non-transitory computer-readable medium of claim 11, wherein generating the payroll adjustment record comprises generating at least one of (i) a negative compensation adjustment or (ii) a paid-time classification adjustment responsive to the compliance score failing to meet a compliance threshold.

15. The non-transitory computer-readable medium of claim 11, wherein the operations further comprise determining a plurality of compliance scores for a plurality of employees for an incentive period, ranking the plurality of employees, allocating a bonus pool amount across at least a subset of the ranked employees, and generating and transmitting payroll adjustment records to distribute the allocated bonus pool amount via the external payroll provider system.

16. The non-transitory computer-readable medium of claim 11, wherein the operations further comprise excluding, from the compliance score, telemetry occurring during at least one of (i) a break interval indicated by a break record received from the external payroll provider system or (ii) an approved exception interval indicated by an approved annotation record.

17. The non-transitory computer-readable medium of claim 11, wherein receiving device engagement telemetry comprises receiving telemetry that is filtered by a telemetry firewall that blocks prohibited data fields including at least one of application identifiers, message content, contact names, or location coordinates.

* * * * *